United States Patent [19]
Milne et al.

[11] Patent Number: 5,390,138
[45] Date of Patent: Feb. 14, 1995

[54] OBJECT-ORIENTED AUDIO SYSTEM

[75] Inventors: Steven H. Milne, Palo Alto; Michael R. Dilts, Saratoga; John C. Tobias, II, Sunnyvale, all of Calif.

[73] Assignee: Taligent, Inc., Cupertino, Calif.

[21] Appl. No.: 120,268

[22] Filed: Sep. 13, 1993

[51] Int. Cl.$^6$ .............................................. H04B 1/00
[52] U.S. Cl. ...................................... 381/119; 395/500; 395/800
[58] Field of Search ................. 381/119; 395/500, 800

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1992 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,151,998 | 9/1992 | Capps . | |
| 5,181,162 | 1/1993 | Smith et al. | 364/419 |
| 5,212,733 | 5/1993 | DeVitt et al. | 381/119 |
| 5,291,587 | 3/1994 | Kodosky et al. | 395/500 |

FOREIGN PATENT DOCUMENTS 90 01195 2/1990 WIPO .

OTHER PUBLICATIONS

Yelton, Geary, *Electronic Musician*, Feb. 1993, p. 123, Review "Mark of the Unicorn, Midi Time Piece II".
Rosenthal, Steve "It's Showtime", NewMedia, Mar. 1993, pp. 36–39.

Primary Examiner—Curtis Kuntz
Assistant Examiner—Mark D. Kelly
Attorney, Agent, or Firm—Keith Stephens

[57] ABSTRACT

A system for connecting an audio object to various multimedia objects to enable an object-oriented simulation of a multimedia presentation using a computer with a storage and a display. A plurality of multimedia objects are created on the display including at least one connection object and at least one audio object in the storage. Multimedia objects are displayed on the display, including at least one audio object. The multimedia object and the audio object are connected, and information is routed via the connection between the multimedia object and the audio object to create a multimedia presentation.

22 Claims, 25 Drawing Sheets

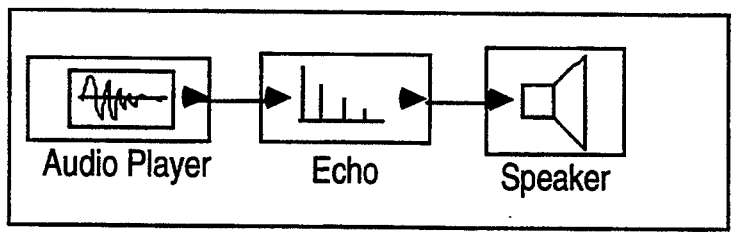
FIGURE 9
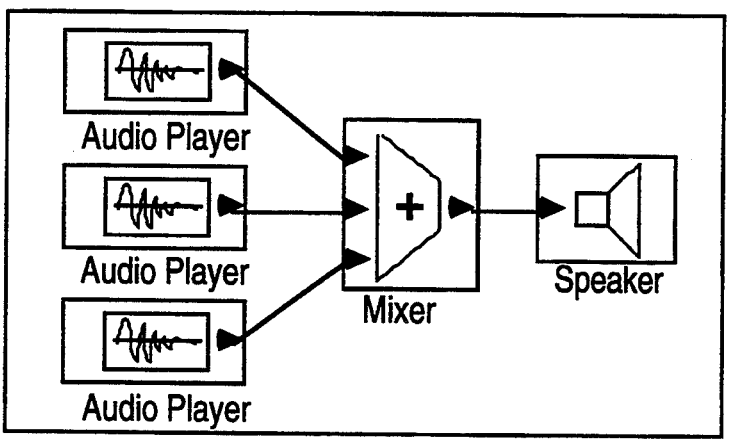
FIGURE 10
| Audio Type | WIDTH | RATE | Description |
|---|---|---|---|
| 44KHZ 16BIT | 44100 | 16 | CD QUALITY |
| 22KHZ 8 BIT | 22050 | 8 | MEDIUM QUALITY |
| 8 KHZ MU LAW | 8000 | 8 | NATS CODED SAMPLES |
| 8 KHZ A LAW | 8000 | 8 | ETS CODED SAMPLES |
FIGURE 11

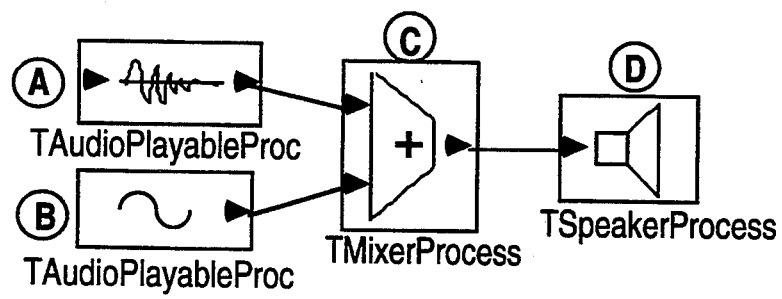
FIGURE 15
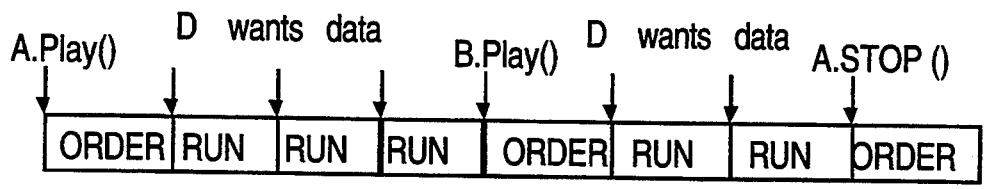
FIGURE 16
AUDIO OUT ▷ ⟶ ▷ AUDIO PORT    = TRUE IF AUDIO
PORT = FIRE        AVAILABLE        PORT HAS FIRED
FIGURE 17

RIGHT            LEFT
LEFT             RIGHT
INPUT   AUDIO  Output
          PLAYER

GAIN

Echo

Audio Type Converter

Audio MultiConverter

Sound 5110  5120  5130  5140  5150

5100

Physical Speaker

Physical
Microphone

Graphic
Player

Graphic
Viewer

Video
Digitizer

MIDI
Player

MIDI
Interface

MIDI
Filter

MIDI
Mapper

MIDI Program
Mapper

MIDI Note
Mapper

MIDI Channel
Mapper

OBJECT-ORIENTED AUDIO SYSTEM

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention generally relates to improvements in computer systems and more particularly to a system for routing audio information between multimedia components.

BACKGROUND OF THE INVENTION

Multimedia is perhaps the fastest growing application for computer systems. Increasingly, users are employing computers to present graphic, sound and imaging information to end users. Users are increasingly demanding ergonomic interfaces for managing multimedia presentations. In the past, a time matrix and programming language were used to implement a multimedia presentation. However, simulating a mixing board to enable the presentation of music or sound with the display of information as a multimedia presentation unfolded was not possible.

Examples of current multimedia systems that do not have the capability of the subject invention are Apple's Quicktime and Microsoft's Video for Windows as described in the March issue of NEWMEDIA, "It's Showtime", pp. 36–42 (1993). The importance of obtaining a solution to the routing problem encountered in the prior art is discussed in the March issue of IEEE Spectrum, "Interactive Multimedia", pp. 22–31 (1993); and "The Technology Framework", IEEE Spectrum, pp. 32–39 (1993). The articles point out the importance of an aesthetic interface for controlling multimedia productions.

SUMMARY OF THE INVENTION

Accordingly, it is a primary objective of the present invention to provide a system and method for connecting, routing and filtering audio, multimedia information throughout the course of a multimedia presentation using a computer with a storage and a display. A processor in the system has an attached storage and an attached display under the control of the processor. A plurality of multimedia objects are created in the storage and displayed on the display. A connecting object is also created in the storage and displayed on the display for use in connecting a multimedia objects to an audio object. Finally, information is routed between the multimedia object and the audio object via the connecting object.

BRIEF DESCRIPTION OF THE DRAWINGS

FIG. 9 is an illustration of a multimedia player that is externally synchronized to a master clock in accordance with a preferred embodiment;

FIG. 10 is an illustration of three sounds, one for music, one for sound effects, and one for voice over, being mixed together and fed through an output device, such as a speaker in accordance with a preferred embodiment;

FIG. 11 is an illustration of some of the audio types supported in accordance with a preferred embodiment;

FIG. 15 is an illustration of audio processors in accordance with a preferred embodiment;

FIG. 16 illustrates how processing is performed for the network shown in FIG. 15 in accordance with a preferred embodiment;

FIG. 17 illustrates an audio port in accordance with a preferred embodiment;

DETAILED DESCRIPTION OF THE INVENTION

Figure 1:
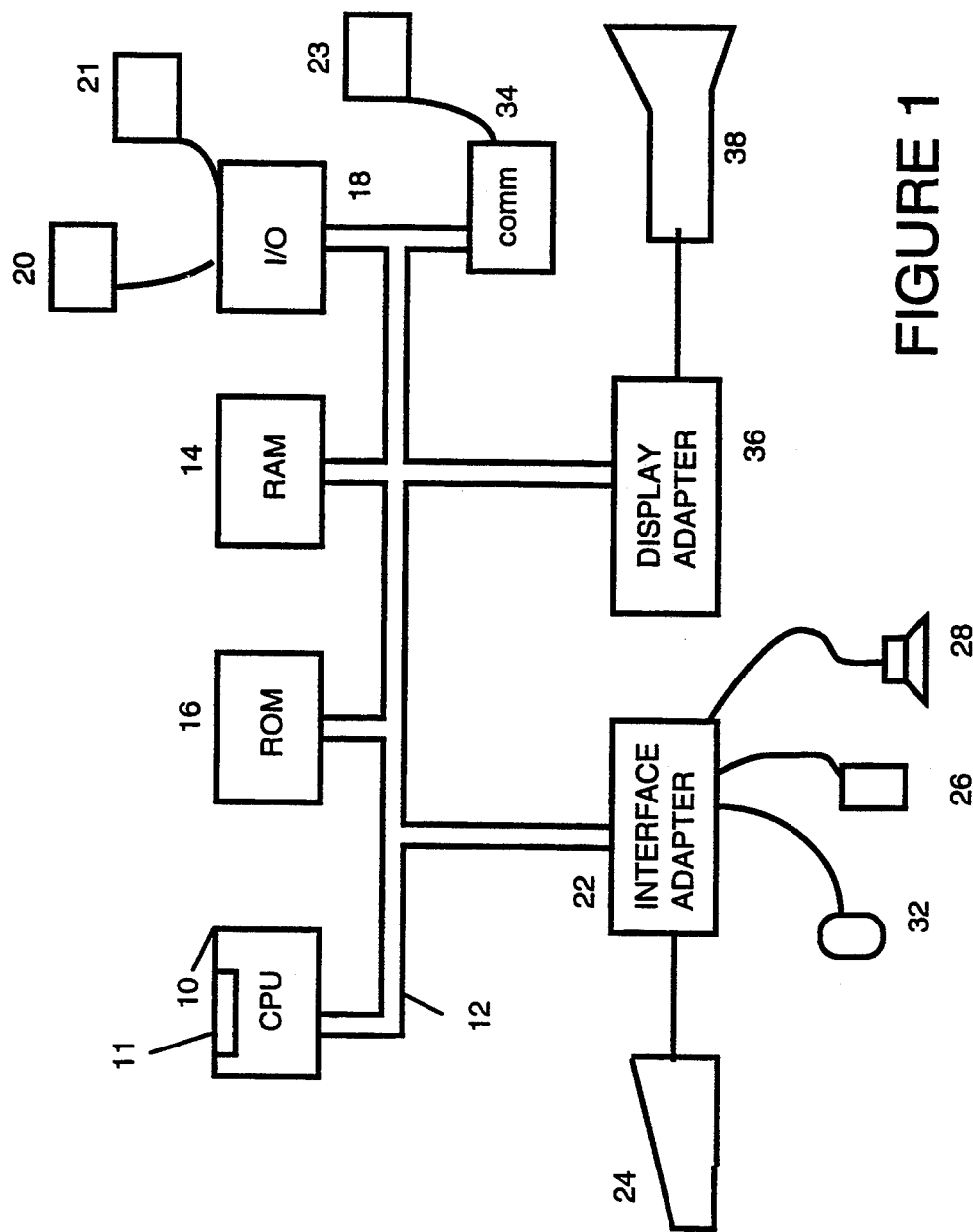
FIG. 1 is a block diagram of a personal computer system in accordance with a preferred embodiment.

The invention is preferably practiced in the context of an operating system resident on a personal computer such as the IBM ® PS/2 ® or Apple ® Macintosh ® computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7 ® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and determines, according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower, non-object layers with procedural Operating System (OS) calls.

Another aspect of object oriented programming is a flamework approach to application development. One of the most rational definitions of frameworks came from Ralph E. Johnson of the University of Illinois and Vincent F. Russo of Purdue. In their 1991 paper, Reusing Object-Oriented Designs, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions. This expertise is embodied in their code. Frameworks allow organizations to capture and package the common characteristics of that expertise by embodying it in-the organization's code. First, this allows developers to create or extend an application that utilizes the expertise, thus the problem gets solved once and the business rules and design are enforced and used consistently. Also, frameworks and the embodied expertise behind the frameworks, have a strategic asset implication for those organizations who have acquired expertise in vertical markets such as manufacturing, accounting, or bio-technology, and provide a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

Types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NeXT), and Smalltalk-80 MVC (ParcPlace).

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multimedia framework which could provide the foundation for supporting new and diverse devices such as audio, video, MIDI, animation, etc. The developer that needed to support a new kind of device would have to write a device driver. To do this with a framework, the developer only needs to supply the characteristics and behaviors that are specific to that new device.

The developer in this case supplies an implementation for certain member functions that will be called by the multimedia framework. An immediate benefit to the developer is that the generic code needed for each category of device is already provided by the multimedia framework. This means less code for the device driver developer to write, test, and debug. Another example of using system frameworks would be to have separate I/O frameworks for SCSI devices, NuBus cards, and graphics devices. Because there is inherited functionality, each flamework provides support for common functionality found in its device category. Other developers could then depend on these consistent interfaces for implementing other kinds of devices.

A preferred embodiment takes the concept of frameworks and applies it throughout the entire system. For the commercial or corporate developer, systems integrator, or OEM, this means all the advantages that have been illustrated for a framework such as MacApp can be leveraged not only at the application level for such things as text and user interfaces, but also at the system level, for services such as graphics, multimedia, file systems, I/O, testing, etc.

Application creation in the architecture of a preferred embodiment will essentially be like writing domain-specific pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the piece the developer plugs in will be small. In other cases, the developer may make very extensive modifications and create something completely new.

In a preferred embodiment, as shown in FIG. 1, a multimedia data routing system manages the movement of multimedia information through the computer system, while multiple media components resident in the RAM 14, and under the control of the CPU 10, or externally attached via the bus 12 or communication adapter 34, are responsible for presenting multimedia information. No central player is necessary to coordinate or manage the overall processing of the system. This architecture provides flexibility and provides for increased extensibility as new media types are added. The system makes use of a variety of multimedia objects, some of which that can be used as connecting objects. The connecting objects include gain, filters, amplifiers, mixers, players and other multimedia components that are individually implemented as objects in an object oriented operating system. Objects, as discussed above include a code or method component and a data component. The system includes a mouse for facilitating iconic operations such as drag/drop, double-clicking, drop-launching, cursor positioning and other typical operations.

Figure 2:
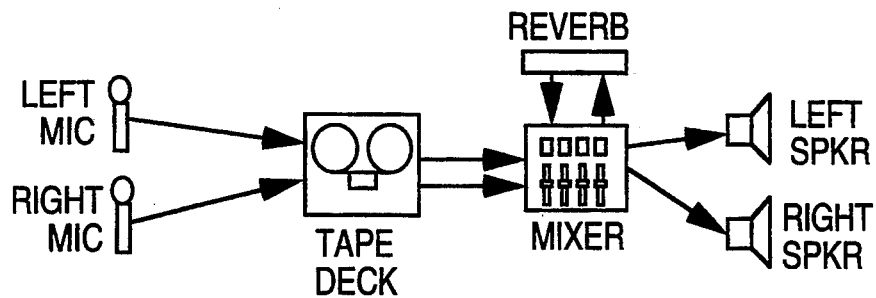
FIG. 2 illustrates a prior art, simple, home studio setup utilizing a tape deck, mixer, reverberation unit, a pair of microphones, and a pair of speakers.

In video and audio production studios, media such as sound, MIDI, and video make use of physical patch cords to route signals between sources, effects processors, and sinks. Signal processing algorithms are also often represented as networks of sources, sinks, and processors. Both of these models can be represented as directed graphs of objects that are connected. A preferred embodiment allows this model—connecting objects together—to be realized on a computer system. FIG. 2 illustrates a prior art, simple, home studio setup utilizing a tape deck, mixer, reverberation unit, pair of microphones, and pair of speakers. Since the microphones are connected to the tape deck, sound input is routed from the microphone to the tape deck, where it can be recorded. When the tape deck plays back, its signal is routed to the mixer because of the connection from the tape deck to the mixer. Similarly, the reverberation unit and the speakers are connected an amplifier connected to the mixer.

A preferred embodiment utilizes object-oriented technology to represent a connection model. Multimedia objects can be connected to each other, creating directed data flow graphs. In addition, a standard set of multimedia objects is defined to the system. These objects can be connected together to facilitate multimedia data flow from object to object. The connection operations can be facilitated by connecting multimedia objects via a geometric figure such as a line, line segment or other appropriate geometry. The figures discussed below show examples of various multimedia objects, including connecting objects and the geometric figures that are used to represent the internal data structures and logic joining the multimedia objects.

Classes for Routing

Figure 3:
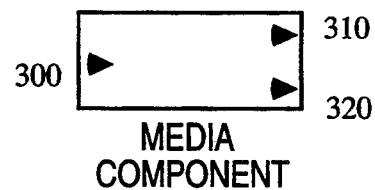
FIG. 3 is an illustration of a media component in accordance with a preferred embodiment.

A time-based media component (hereafter referred to as a media component) base class is a central abstraction used for routing. A media component has zero or more input ports and zero or more output ports. In FIG. 3, for example, the media component has a single input port 300 and two output ports 310 and 320. Ports 300, 310 and 320 are represented as filled triangles.

Figure 4:
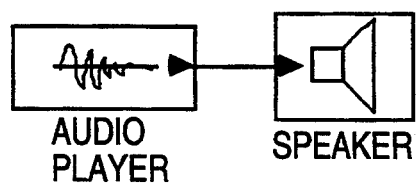
FIG. 4 is an illustration of an audio player component in accordance with a preferred embodiment.

Subclasses of media components are connected together by connecting their ports. This processing is analogous to using patch cords to connect audio and video components together in a recording studio. In FIG. 4, a subclass of a media component, an audio player component object, is connected to another media component subclass, a speaker component object. The audio player has one output port and the speaker has one input port. Media components are controlled using member function calls. The audio player in FIG. 4, for example, has member functions for playing audio data. When the audio player's member function Play() is called, audio data will be fed from the audio player to the speaker, which will cause the audio to be heard on the computer's speaker. The speaker component does not have a Play() function because it plays whatever audio data is transmitted to it. Media components can be implemented completely in software. However, it is possible for a media component to represent a physical piece of hardware. For example, a speaker object can be employed to represent playback hardware of a computer. In this way, external media devices, such as video tape recorders, mixers, and effect processors, can be represented as media components and be connected together.

Connecting Media Components

Media components are connected together by connecting their ports. To prevent client objects and components from writing data simultaneously to the same port, thereby compromising data integrity, clients are not allowed to access ports directly. Instead, clients perform connection operations on multithread-safe surrogate objects. In the context of this description, the term "surrogate" refers to a specialized representation of an underlying class which permits multiple clients to share instances of the class safely. In the case of the media components, surrogate ports permit limited indirect manipulation of the actual ports. Every media component has member functions which create surrogates for each of its input and output ports. These port surrogates are extremely lightweight objects and are well-suited for traversing address boundaries, thus facilitating the connection of media components which reside in different address spaces.

Each port and port surrogate has a data type associated with it. Examples of types are MIDI data, 44 kHz 16 bit audio data, 22 kHz 8 bit audio data, and graphic data for video. When two ports are asked to connect, a type negotiation protocol insures that the ports are capable of supporting compatible data types. An exception is generated if the ports have no types in common.

Figure 5:
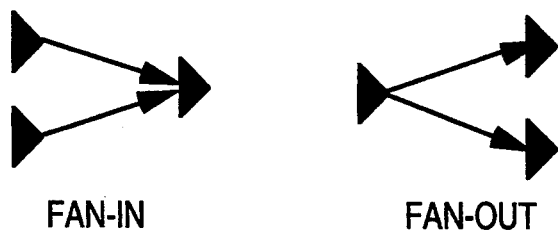
FIG. 5 is an illustration of fan-in and fan out ports in accordance with a preferred embodiment.

Converter objects can be inserted between objects which have incompatible port types. Converters are components which take in data of one type in order to produce data of a different type. Examples of fan-in and fan-out ports are shown in FIG. 5. Specific subclasses may choose to disallow fan-in and/or fan-out. Audio ports, for example, disallow both, and exceptions are generated by any attempt to connect one port to more than one other port. Fan-in and fan-out properties are handled by the specific media subclasses. For example, in MIDI, fan-out sends the same data to multiple recipients, and fan-in merges data from multiple senders.

Two media components, A and B, are connected together by:
1) calling a member function of A to request an output port surrogate, Pa;
2) calling a member function of B to ask for B's to request an input port surrogate, Pb;
3) calling Pa's member function, ConnectTo, and passing in Pb as an argument.

The ports can be disconnected by calling Pa's member function, DisconnectFrom, and passing in Pb as an argument. The above procedures are invoked when connecting or disconnecting any media components, whether the port type is audio, graphic, MIDI or some other multimedia data type. There is no compile-time checking when two ports are connected. For example, there is nothing to prevent a software developer from writing, compiling, and linking code which attempts to connect an audio port with a MIDI port. Instead, an exception is thrown at run time. This behavior has been explicitly designed into the routing system in order to enable polymorphic connection of media ports. A patching module, for example, could connect pairs of media ports together at specific connect times without having to give special treatment to different port types. Audio, video, and MIDI ports would all be handled in exactly the same way by a patcher. Connection of objects can be represented visually by drawing a line segment between indicia representative of the multimedia objects such as an icon on the display.

Routing Audio Data

Figure 6:
FIG. 6 is an illustration of an audio component with zero or more audio input ports and zero or more audio output ports in accordance with a preferred embodiment.

Audio can be digitized, stored, processed, and played back on a computer. A computer can also be used to synthesize and playback audio. An Analog to Digital Converter (ADC) is used to convert an analog audio electrical signal to a series of numbers called digital audio samples. The audio is typically sampled at rates of 8000 samples per second for telephone quality audio all the way up to 44,100 samples per second for Compact Disc (CD) quality audio and 48,000 samples per second for Digital Audio Tape (DAT). Once in numeric form, the audio can be stored and processed by the computer. The digital audio samples are converted back to an analog audio electrical signal by using a Digital to Analog Converter (DAC). A preferred embodiment defines subclasses of port objects called audio ports that are used to route digital audio data between media components. Audio output ports can be connected to audio input ports to route audio data. If a media component has at least one audio port, it is called an audio component. All audio components are subclasses of media component base class. An audio component has zero or more audio input ports and zero or more audio output ports, as shown in FIG. 6. Audio components can be connected together by connecting their ports. This is analogous to using patch cords to connect stereo components together utilizing hardware.

Figure 7:
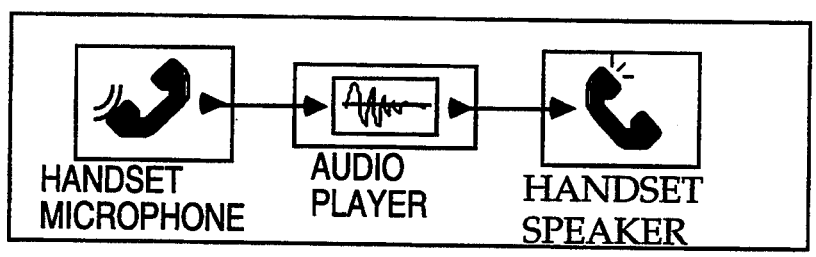
FIG. 7 is an illustration of a voice annotation application enabled by using an audio player to record and play voice annotations in accordance with a preferred embodiment.
Figure 8:
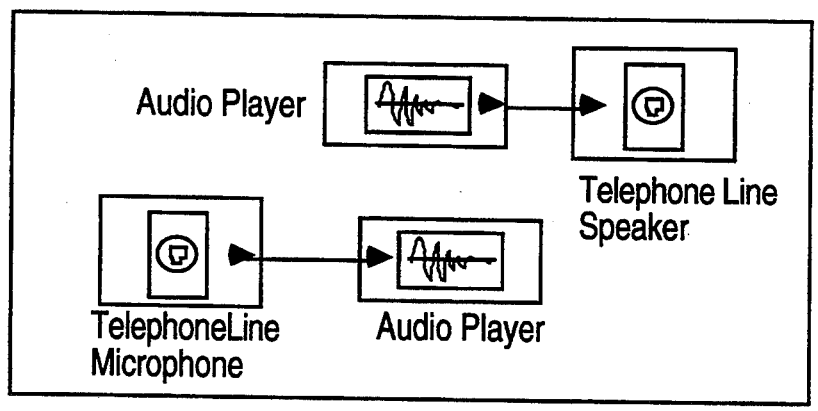
FIG. 8 is an illustration of a voice mail/phone answering application in accordance with a preferred embodiment.

A preferred embodiment facilitates the connection of audio components to create a variety of interesting applications. FIGS. 7, 8, 9 and 10 illustrate some example applications that can be constructed using audio components. FIG. 7 shows how a voice annotation application can be written by using an audio player to record and play voice annotations. A telephone handset is used for input and output. FIG. 8 shows how a voice mail/phone answering application can be constructed. One audio player plays a greeting out over the phone line while another audio player records an incoming message. FIG. 9 illustrates a music application. Echo, a special effect, is added to a musical instrument sound and played through a speaker. FIG. 10 illustrates how three sounds, one for music, one for sound effects, and one for voice over, can be mixed together and fed through an output device, such as a speaker.

Like all media components, audio components are connected together by connecting their ports. This operation is facilitated by selecting an audio component port, extending a geometric figure such as a line from the component port to another multimedia component port and creating a data structure commemorating the linkage represented graphically on the display. Every audio component has member functions which create surrogates for its input and output ports. Clients perform connection operations by requesting input and/or output port surrogates from each component and then using the member functions provided by the surrogate objects to connect the actual input ports to actual output ports. Each audio port and port surrogate has an audio type associated with it. FIG. 11 lists some of the audio types supported by a preferred embodiment.

Figure 12:
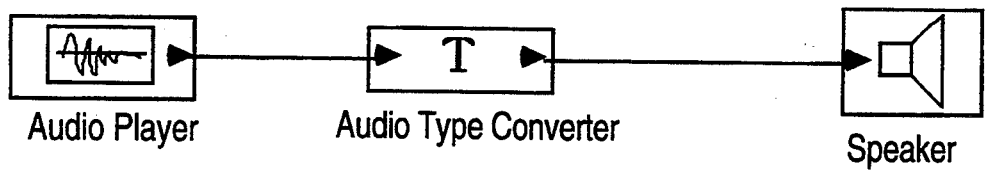
FIG. 12 is an illustration of a conversion process, to convert from one audio type to another in accordance with a preferred embodiment.

A connection, represented by the linking line segment on the display, represents a single audio channel. Stereo is handled by using two connections, one for the left channel and one for the right. When two ports are asked to connect, a type negotiation protocol insures that the ports are capable of supporting compatible data types. An exception is generated if the ports have no types in common. If this happens, an audio type converter can be inserted between the two ports to convert from one type to another as illustrated in FIG. 12. No loops (cycles) are allowed in a network of audio components. Any attempt to perform a connection that would result in a loop causes an exception to be thrown. The process of connecting audio components is represented graphically on the display by extending a geometric figure, such as a line segment, between icon like figures representative of the audio input and output ports of indicia representative of multimedia objects.

Implementing Audio Components

A client-server based architecture is used to implement audio components. For every audio component, there is an audio processor object that resides in a task called the sound server. The audio processor object is responsible for performing the actual signal processing. Audio component subclassers have to write both an audio component and an audio processor subclass. A client/server approach is used to enhance performance. Patch cord-style routing of audio is most efficiently implemented if all data movement and signal processing are done in a single task. This avoids unnecessary Interprocess Communication (IPC) and context switches. Given that clients exist in many different tasks, a sound server is required to centralize the processing in a single task.

An alternative implementation has been explored which handles signal processing in a separate task per audio component. No server is needed for audio processing. This is an elegant alternative with many advantages, but unfortunately it has one drawback—it is over an order of magnitude slower than the approach presented in a preferred embodiment of the invention. On monoprocessors, this ratio would remain fairly constant even as machines are built with enhanced processing power.

Client/Server Model

Figure 13:
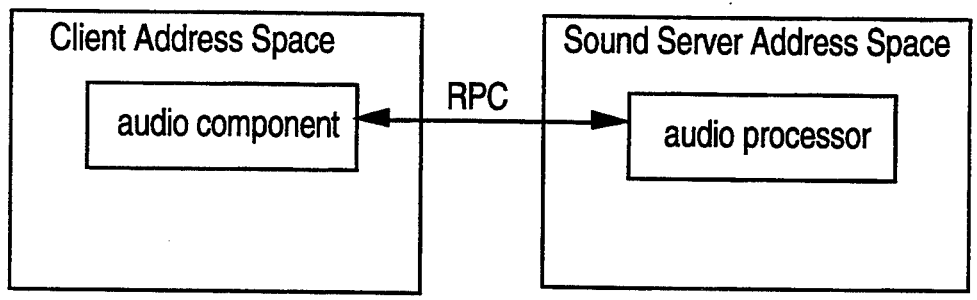
FIG. 13 is an illustration of a remote procedure call in accordance with a preferred embodiment.

Audio components require facilities for communicating with their corresponding audio processors. A Remote Procedure Call (RPC) interface is used to do this. Generally, member functions of an audio component subclass remotely invoke the "real" member function on the audio processor. FIG. 13 is a block diagram illustrating a remote procedure call in accordance with a preferred embodiment.

Making Connections

Audio processors, in contrast to audio components, own the audio ports. Audio components own the audio port surrogates. Whenever two port surrogates are connected together in the client address space, the corresponding audio ports are connected together in the sound server address space. Subclassers are not required to take any enabling action, the framework does it for them.

Processing Audio

Figure 14:
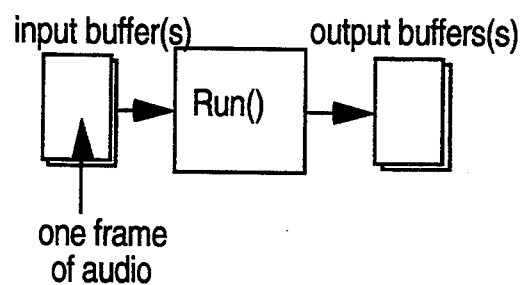
FIG. 14 is an illustration of an audio processor architecture with an associated Run() member function which reads data from its input buffers, processes it, and writes the result to its output buffers in accordance with a preferred embodiment.

Connections between audio ports are implemented using buffers of audio data. Each connection, or "patch cord," has a buffer associated with it. The audio processor can ask each of its audio ports for the address and size of this buffer. FIG. 14 is a block diagram illustrating an audio processor architecture with an associated Run() member function which reads data from its input buffers, processes it, and writes the result to its output buffers. The size of the buffers is variable but the preferred size accommodates 5 milliseconds worth of samples. This size is necessary to reach a performance goal of being able to start and stop sounds with a maximum of 10 ms latency.

Frame-Based Processing

The sound server uses a technique called frame-based processing to process sound samples. The basic process is presented below.
1) Order the audio processors so that producers come before consumers.
2) For each audio processor, call it's Run() member function. Repeat this step whenever an I/O device requires data.

This is an extremely efficient way to process audio, because once the running order is figured out, frames can be produced cheaply by calling Run(). Run()'s implementation can be very efficient, because it utilizes fixed size buffers that can be completely processed in a single frame. For example, consider FIG. 15, which illustrates a network of audio processors. Each audio processor, or node, is labeled with a letter.

To produce sound, the sound server performs the following steps:
1) Orders the audio processors so that producers come before consumers; and
2) Runs them whenever an audio I/O device, such as the speaker, needs more data.

FIG. 16 illustrates how this processing is performed for the network shown in FIG. 15. In the first block the audio processors are ordered, then the processors are run in the specified order. In parallel, information is obtained for each of the processors. No processor is run before its time, in other words, until the appropriate information is available for the processor, the processor enters a wait state.

Ordering Audio Processors

Audio processors are ordered employing a technique called simulated data flow. Most subclassers don't need to worry about ordering because ordering is determined automatically by a framework in most cases. Simulated data flow iterates through the network in topological order, as if to pass data from one processor to the next. This is done to see which audio processor can run and which audio processor can't. Audio processors that run are put on the run list, and are utilized over and over again during the run phase.

An audio processor node can run if:
1: its input ports has data available, AND
2: its output ports have a place to put data.

Each audio processor has a CanRun() member function, which returns TRUE if the node can run. CanRun()'s default implementation uses the above rules, so a subclasser only has to override CanRun() if the audio processor needs to override a rule. If an audio processor can run, it simulates the flow of data out on all output ports. Fire() actually just turns around and calls another Fire() member function on each output port. Firing an output port simulates the flow of data out the port, making simulated data available on the input port on the other side. Input ports have an IsAvailable() member function, which returns TRUE if the port has simulated data available. FIG. 17 illustrates an audio port in accordance with a preferred embodiment.

Figure 18:
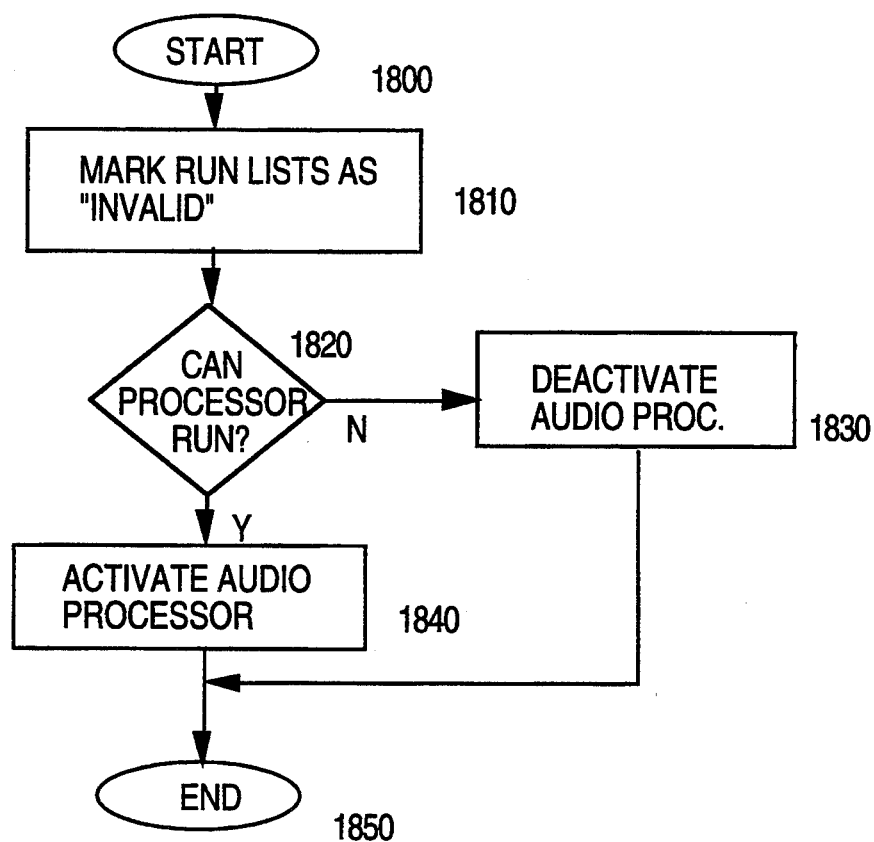
FIG. 18 is an illustration of an audio processor, such as a player, in accordance with a preferred embodiment.
Figure 19:
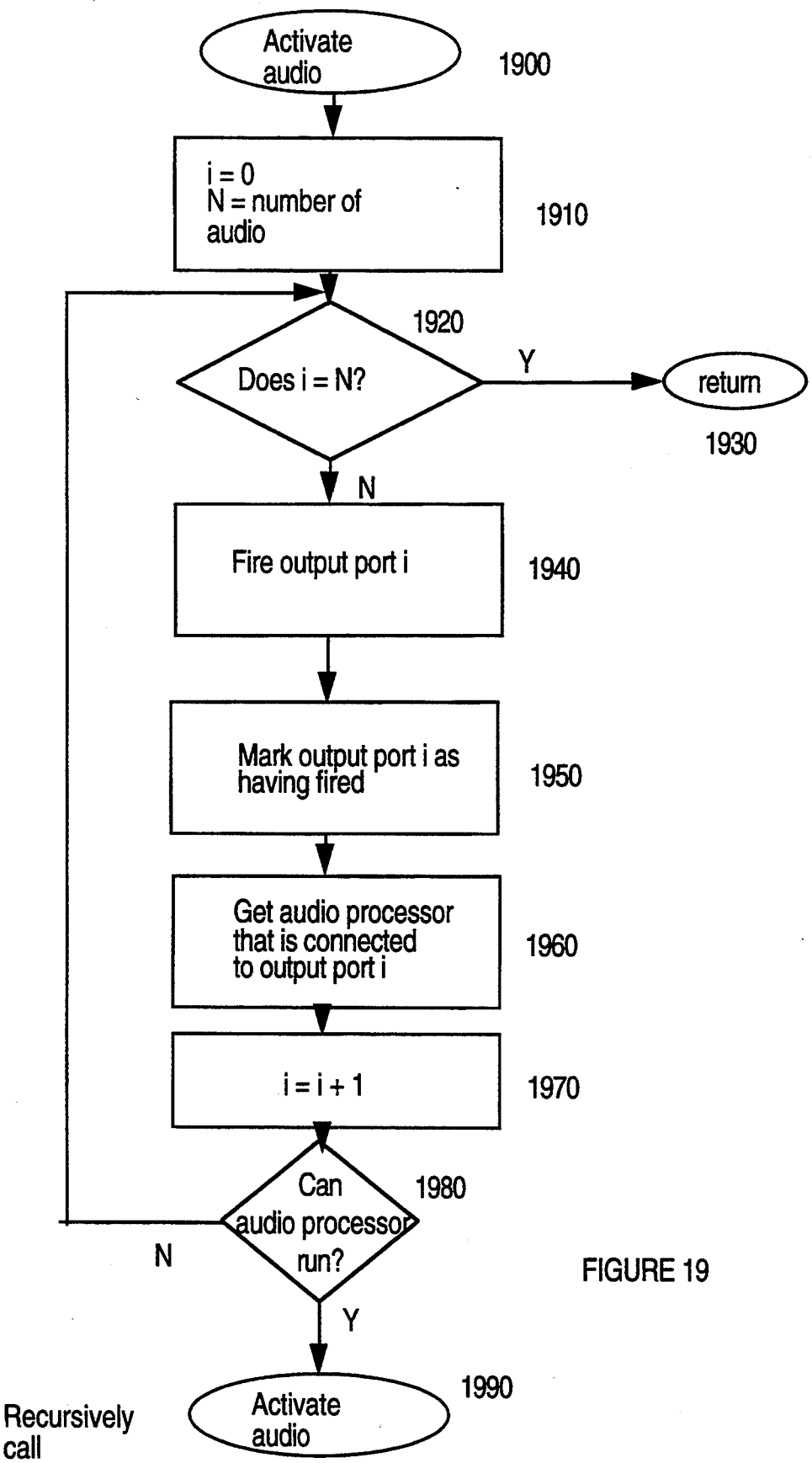
FIG. 19 is a flowchart of the recursive logic associated with activating an audio processor in accordance with a preferred embodiment.
Figure 20:
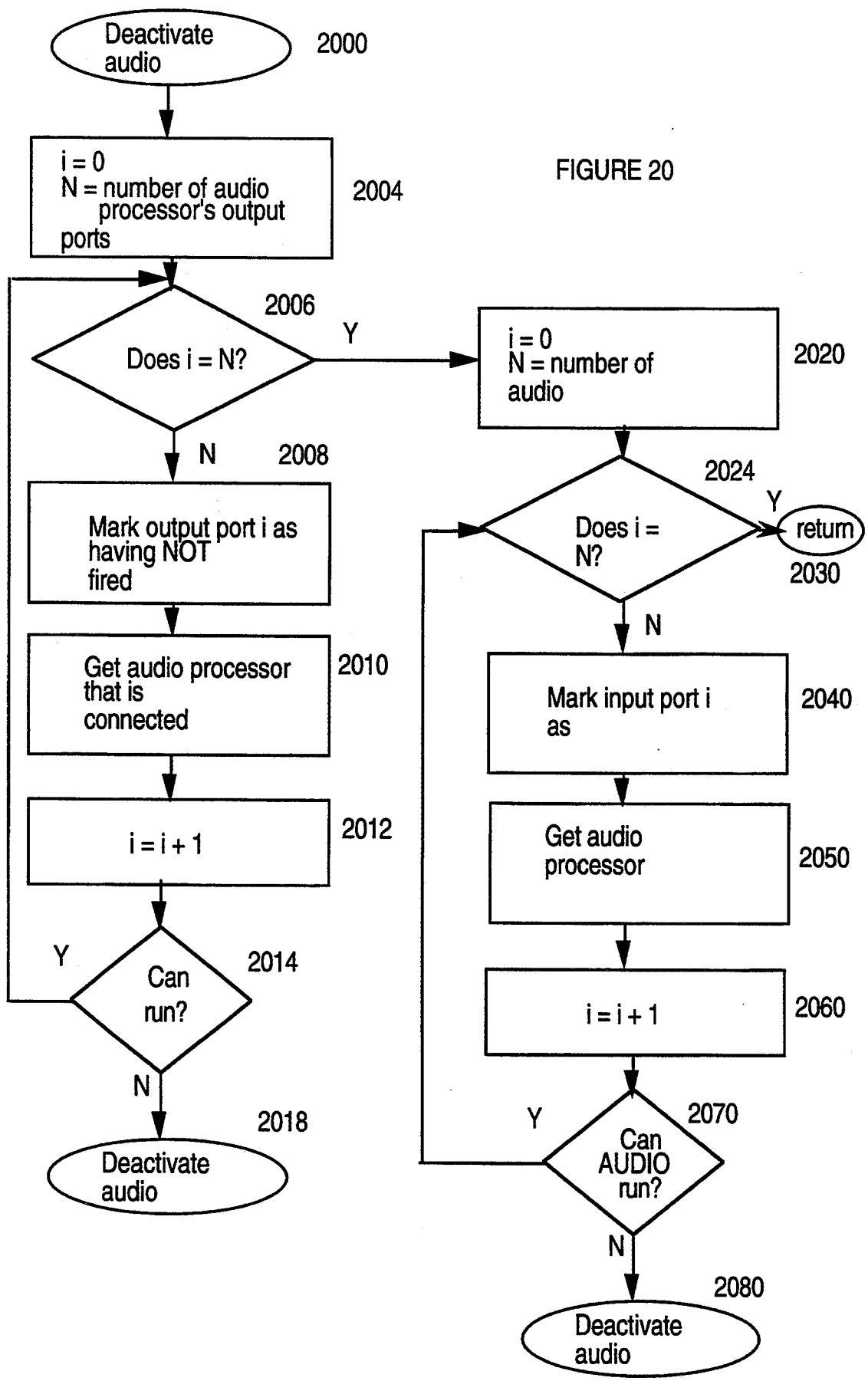
FIG. 20 is a flowchart setting forth the detailed logic associated with deactivating the audio processor in accordance with a preferred embodiment.

Delays must take priority over CanRun() because the input to a delay goes silent. Therefore, the delay must still produce output until the delay is exhausted. The input port no longer has data available but the audio processor must still run. CanRun() must be modified to return TRUE when no input is available and there is still data in the delay that must be output. Players must also override CanRun(), because when a player is stopped, a player can't run, even if the dataflow criteria are met. Players must modify the rules so that CanRun() always returns FALSE if the player is stopped, regardless of whether dataflow criteria are met or not. An audio processor can query its audio output port to ascertain the delay from when the data is written to the port's buffer to when the audio will actually be heard by the user. This allows audio processors to synchronize to arbitrary time bases. FIGS. 18, 19 and 20 are flowcharts illustrating the logic associated with audio processors. An audio processor, such as a player, determines that execution is required and invokes RequestOrder, which is depicted in FIG. 18.

FIG. 18 is a flowchart presenting the detailed logic for calling an order request in accordance with a preferred embodiment. Processing commences at terminal 1800 and immediately passes to function block 1810 to mark the run list invalid. The run list can be marked invalid by drop launching a multimedia object, double-clicking on a multimedia object or using any other iconic operation to signify initialization of an operation. Then, at decision block 1820, a test is performed to determine if the audio processor can run. If so, then at function block 1830, the audio processor is deactivated and control is passed to terminal 1850. However, if the audio processor cannot run, then in function block 1840, the audio processor is activated and control passes to terminal 1850.

FIG. 19 is a flowchart of the recursive logic associated with activating an audio processor in accordance with a preferred embodiment. Processing commences at terminal 1900 where control is passed from function block 1840 or a recursive call is made from terminal 1990. In either case, control is immediately passed to function block 1910 where index i is equated to zero and counter N is set equal to the number of audio processor output ports. Then, a test is performed at decision block 1920 to determine if counter i=N. If so, then control is returned at terminal 1930. If not, then output port i is fired at function block 1940, the output port is marked as having fired at function block 1950, the audio processor connected to the output port is obtained at function block 1960, counter i is incremented at function block 1970, and a test is performed at decision block 1980 to determine if the audio processor can run. If the audio processor can run, then a recursive call to the logic in FIG. 19 is placed via terminal 1900. If not, then control is passed to decision block 1920 to continue processing.

FIG. 20 is a flowchart setting forth the detailed logic associated with deactivating the audio processor. Processing commences at terminal 2000 where control is passed from function block 1830, or a recursive call is made from terminal 2018 or 2080. In either case, control is immediately passed to function block 2004 where index i is equated to zero and counter N is set equal to the number of audio processor output ports. Then, a test is performed at decision block 1920 to determine if counter i=N. If so, then control is passed to function block 2020 to reinitialize the index and counter. Then, at decision block 2024, a test is performed to determine if i=N. If not, then input port i is marked as having not fired at function block 2040, the audio processor connected to the input port is obtained at function block 2050, counter is incremented at function block 2060, and a test is performed at decision block 2070 to determine if the audio processor can run. If so, then control is returned at terminal 2024. If the audio processor cannot run, then a recursive call to the logic in FIG. 20 is placed via terminal 2080. If the audio processor can run, then control is passed to decision block 2024 to test the index again.

If index i does not equal to N at decision block 2006, then the output port i is marked as having NOT fired in function block 2008, the audio processor connected to the output port is obtained at function block 2010, counter i is incremented at function block 2012, and a test is performed at decision block 2014 to determine if the audio processor can run. If the audio processor cannot run, then a recursive call to the logic in FIG. 20 is placed via terminal 2018. If not, then control is passed to decision block 2006 to test the index again and continue the processing.

Figure 21:
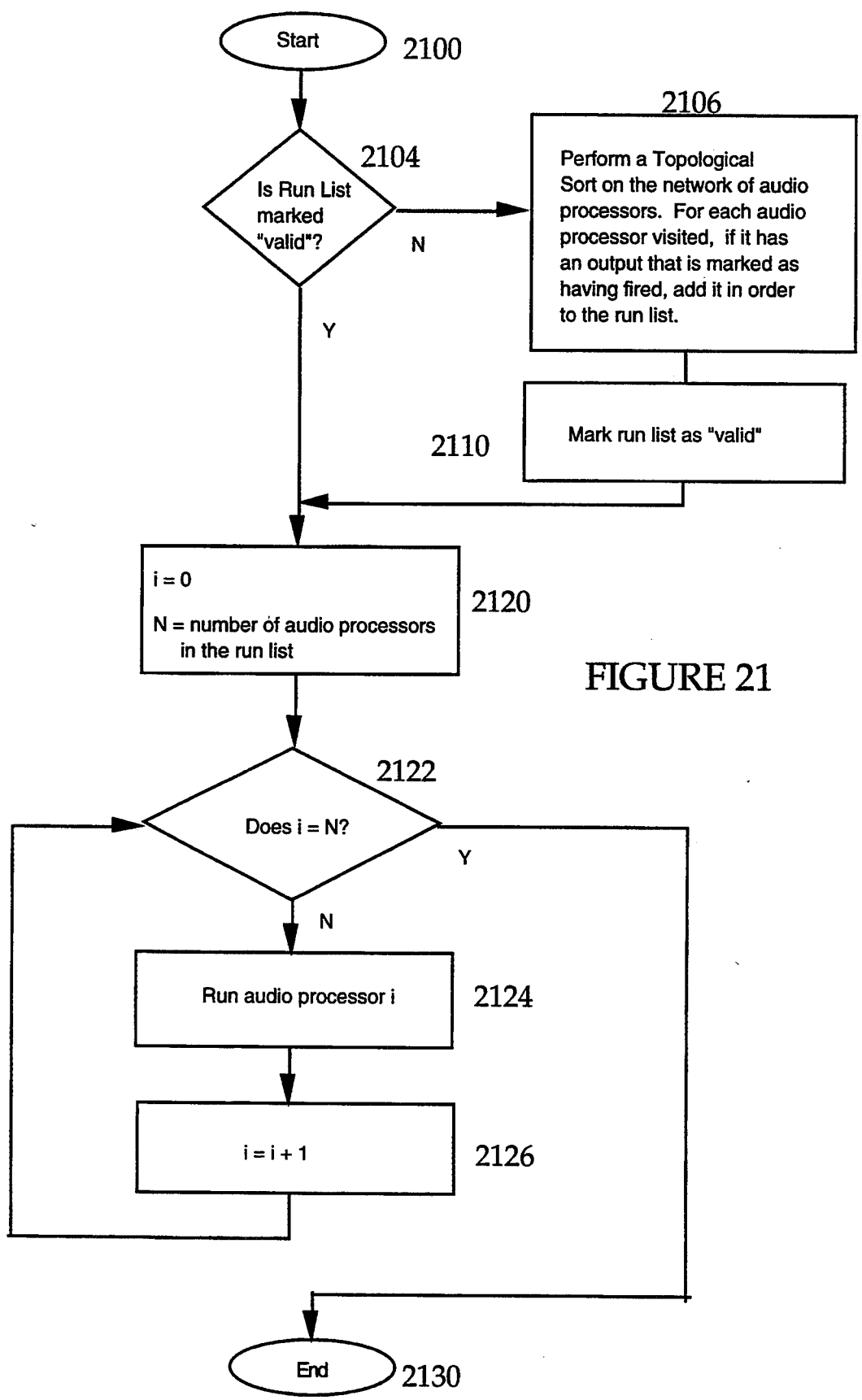
FIG. 21 is a flowchart setting forth the logic associated with running an audio processor in accordance with a preferred embodiment.

FIG. 21 is a flowchart setting forth the logic associated with running an audio processor in accordance with a preferred embodiment. Processing commences at terminal 2100 and immediately passes to decision block 2104 to determine if the run list is valid. If the run list is not valid, then a topological sort is performed in function block 2106 to sort the audio processors in fired order. Then, in function block 2110, the sorted list is marked as valid, and control passes to function block 2120. If the run list was not valid at decision block 2104, then control passes to function block 2120 to reset the index i and initialize the count N. Next, a test is performed at decision block 2122 to determine if the counter i has reached the count N. If so, then processing is completed and control passes to terminal 2130. If not, then audio processor i is run as depicted in function block 2124, and the index i is incremented as depicted in function block 2126.

Routing Video and Graphical Data

Video information can be digitized, stored, processed, and played back on a computer. A video digitizer is used to convert an analog video electrical signal to a series of digital images, called a frame. The number of frames digitized per second is called the frame rate. Fifteen to thirty frames a second are typical frame rates. Once in digital form, the video can be stored and processed by the computer. The video can be played back by displaying the digital images in sequence at the original frame rate on a computer screen.

A graphic object is a base class used to represent any object that can be displayed on a computer screen. Subclasses of the graphic object, include, but are not limited to polygons, curves, and digital images. Each frame of digitized video is a digital image, and hence can be represented by a graphic object.

Figure 22:
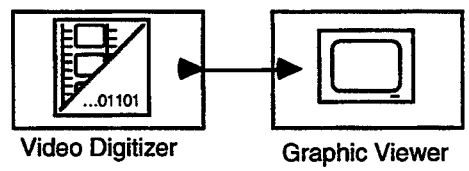
FIG. 22 is an example of patching a video digitizer component to a viewer component for display on a computer's screen in accordance with a preferred embodiment.

Graphic input and output ports are used to route graphic objects from one media component to another. Digital video can be routed this way, as each video frame is a graphic object. Animation data can also be routed with graphic ports, because graphic ports can route any graphic object. Using media components containing graphic ports, it is possible to create networks of video objects with video streaming between them. A variety of interesting applications can be constructed this way. FIG. 22 illustrates an example of patching a video digitizer component to a viewer component for display on the computer's screen in accordance with a preferred embodiment.

Figure 23:
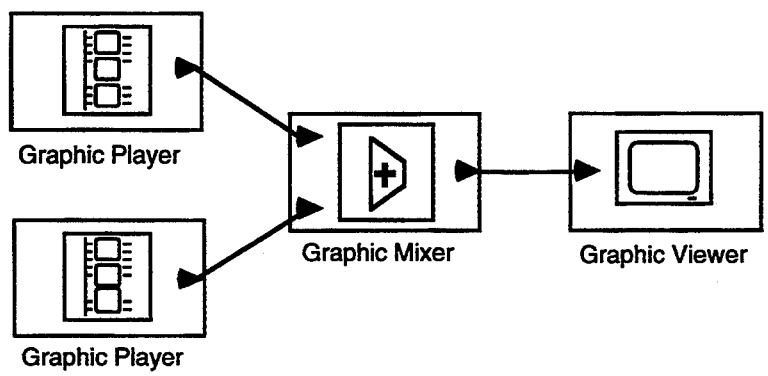
FIG. 23 is an example of mixing images from two video objects in an effects processor and displaying the result on a computer screen in accordance with a preferred embodiment.

FIG. 23 is a more complicated example of mixing images from two video objects in an effects processor and displaying the result on a computer screen in accordance with a preferred embodiment. Graphic ports are connected together by means of port surrogates. Every video component has member functions which create surrogates for its input and output ports. Clients perform connection operations by requesting input and/or output port surrogates from each component. Then, using the member functions provided by the surrogate objects connect the actual input ports to actual output ports. Each graphic port and port surrogate has a graphic type associated with it. When two ports are asked to connect, a type negotiation protocol insures that the ports are capable of supporting compatible data types. An exception is generated if the ports have no types in common.

The process of connecting video components can be represented graphically on a display by extending a geometric figure such as a line segment between the indicia representative of a video input and output ports.

Routing Data

Graphic ports manipulate graphic data by reading and writing pointers to graphic objects. The port implementation for writing is synchronous: the graphic output port's Write() member function blocks until the receiver is done with the graphic object being sent. The graphic port does not employ copy semantics for performance reasons. Copying RGB bit-mapped images is avoided because of the amount of processor and storage involved in such operations. Instead, a pointer to the graphic object is sent from the graphic output port to the graphic input port. The synchronous interface functions across address spaces if shared memory is used for storing the graphic objects being written and read, or if the graphic objects are copied across a task's address space. Blocked graphic ports are unblocked in the event that a connection is broken.

Figure 24:
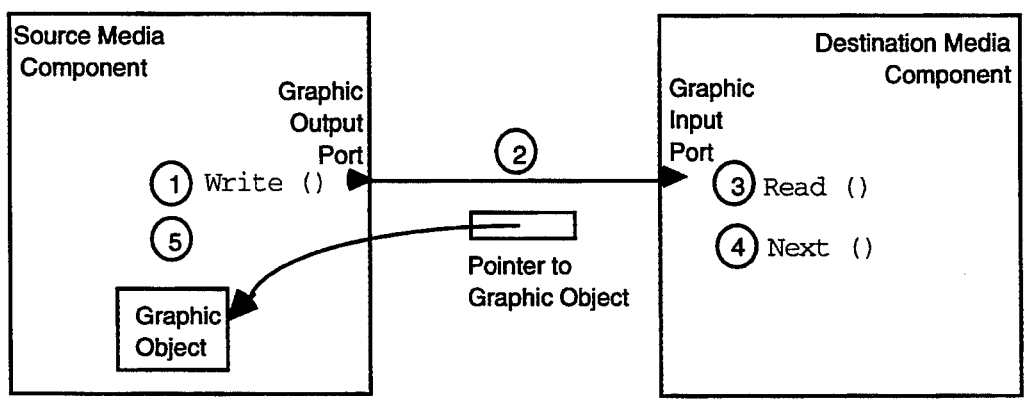
FIG. 24 illustrates how graphic ports are used in accordance with a preferred embodiment.
Figure 25:
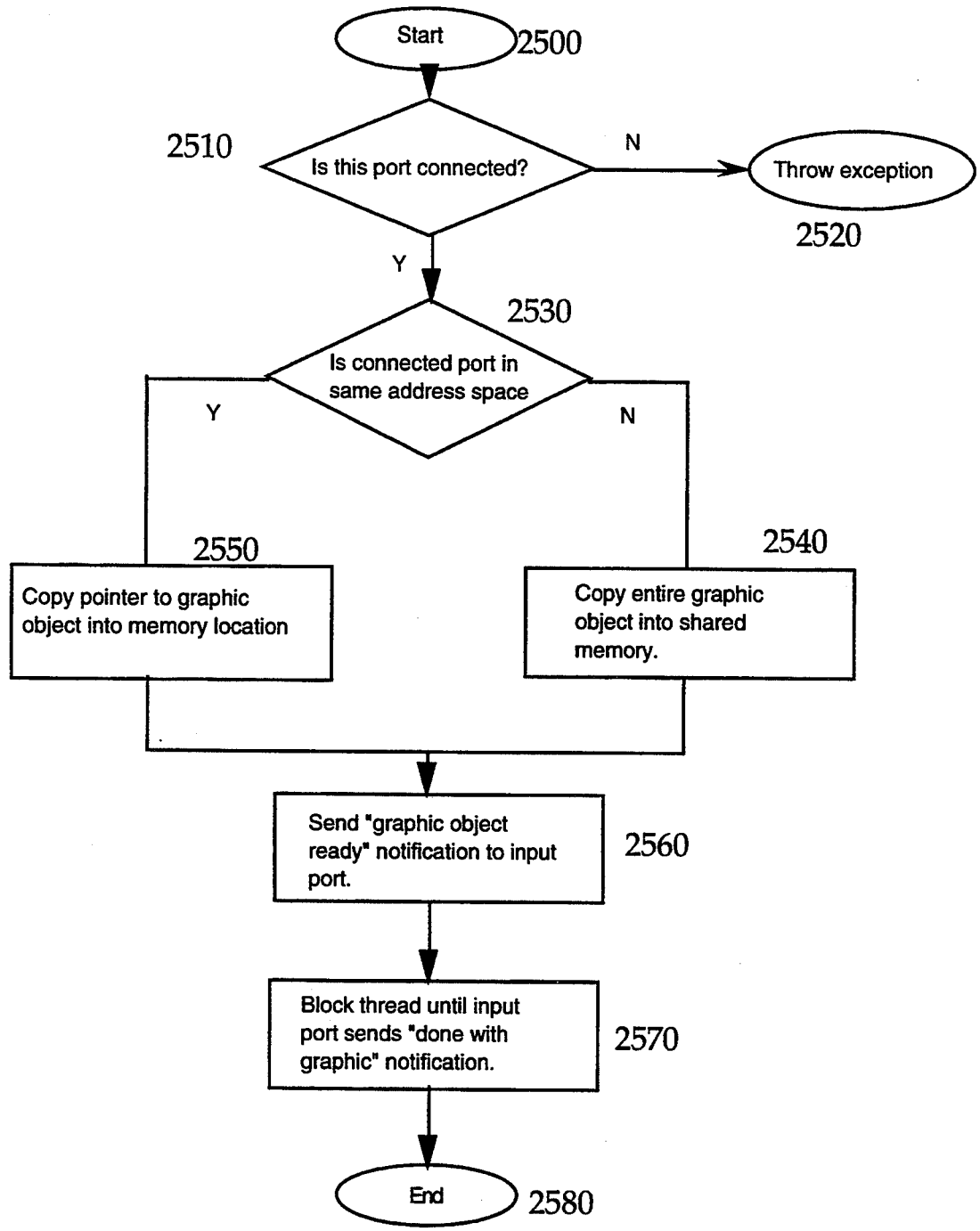
FIG. 25 is a flowchart presenting the logic associated with an output port's Write member function in accordance with a preferred embodiment.

FIG. 24 illustrates how graphic ports are used in accordance with a preferred embodiment. 1) A task in the source media component writes a graphic object to the media component's output port. 2) A pointer to the graphic object is transferred to the connected input port of the destination media component. 3) A task in the destination media component, having called it's input port's Read() member function and blocked, unblocked and read the graphic object pointer. 4) When this task is finished processing the graphic object, it calls the Next() member function of the destination media component's input port. 5) The source media component's task unblocks, returning from the write call. It can now safely dispose of the graphic object because the destination is finished with it. FIG. 25 is a flowchart presenting the logic associated with an output port's Write member function. A pointer to a graphic object is passed into this member function. Processing commences at terminal 2500 and immediately passes to decision block 2510 to determine if the port is connected. If the port is not connected, then an exception occurs as shown at terminal 2520. If a port is connected, then a test is performed at decision block 2530 to determine if the connected port is in the same address space. If the port is not in the same address space, then at function block 2540, the entire graphic object is copied into shared memory. If the port is in the same address space, then a pointer to the graphic object is copied into memory. In either case, the next step is to send a notification to the input port as depicted at function block 2560, block the task until the input port notifies the port processing is completed as depicted at function block 2570, and terminating at terminal 2580.

Figure 26:
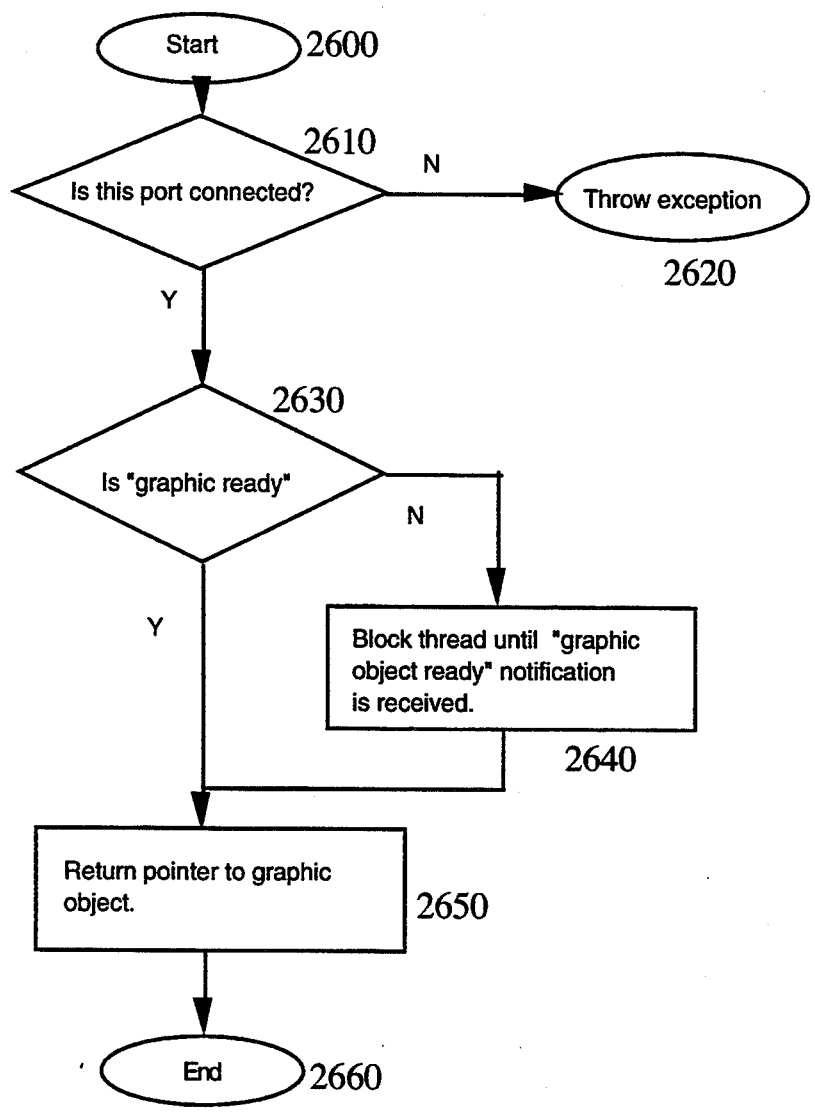
FIG. 26 is an illustration of an input port's read processing in accordance with a preferred embodiment.

FIG. 26 illustrates an input port's read processing in accordance with a preferred embodiment. Processing commences at terminal 2600 and immediately passes to decision block 2610 to determine if the port is connected. If the port is not connected, then the framework generates an exception at terminal 2620. If the port is connected, then another test is performed at decision block 2630 to determine if the graphic is ready. If not, then a block task is processed until the object is ready as depicted in function block 2640, and control is passed to function block 2650. If the graphic is ready, then a pointer is returned to the graphic object in function block 2650 and control is returned via terminal 2660.

Figure 27:
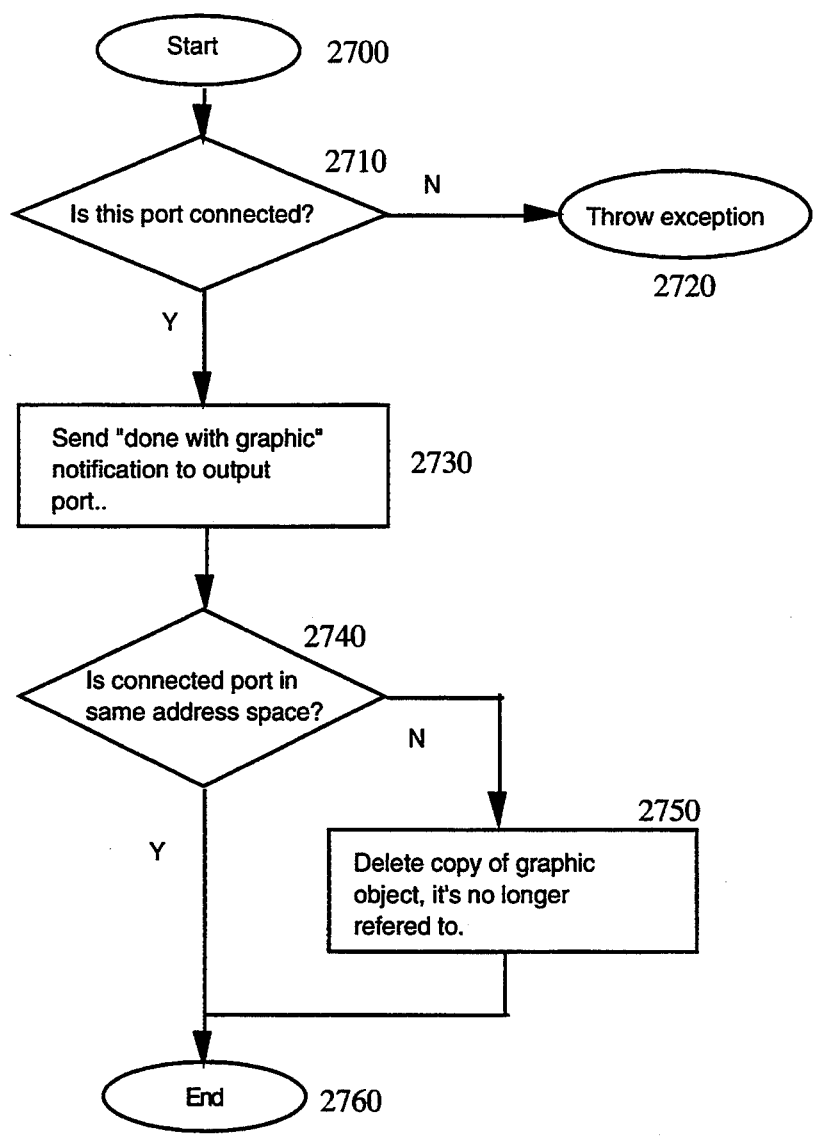
FIG. 27 illustrates an input port's next member processing in accordance with a preferred embodiment.

FIG. 27 illustrates an input port's next member processing in accordance with a preferred embodiment. Processing commences at terminal 2700 and immediately passes decision block 2710 to determine if the port is connected. If the port is not connected, then an exception occurs as shown in terminal 2720. If the port is connected, then an appropriate notification is transmitted as shown in function block 2730, and another test is performed at decision block 2740 to determine if the connected port is in the same address space. If the port is in the same address space, then processing is completed at terminal 2760. If the port is not in the same address space, then a copy of the graphic object is deleted as shown in function block 2750 and processing is terminated at terminal 2760.

Routing MIDI Data

Musical Instrument Digital Interface (MIDI) defines an interface for exchanging information between electronic musical instruments, computers, sequencers, lighting controllers, mixers, and tape recorders as discussed in MIDI Manufacturers Association publication entitled, *MIDI 1.0 Detailed Specification* (1990). MIDI is extensively used both in the recording studio and in live performances and has had enormous impact in the areas of studio recording and automated control, audio video production, and composition. By itself and in conjunction with other media, MIDI plays an integral role in the application of computers to multimedia applications. In comparison to digital audio, MIDI files take up much less space, and the information is symbolic for convenient manipulation and viewing. For example, a typical 3 minute MIDI file may require 30 to 60 Kilobytes on disk, whereas a CD-quality, stereo audio file requires about 200 Kilobytes per second, or 36 Megabytes for 3 minutes. MIDI data may appear as musical notation, graphical piano-roll, or lists of messages suitable for editing and reassignment to different instruments. General MIDI has standardized instrument assignments to greatly motivate the multimedia title producer.

Figure 28:
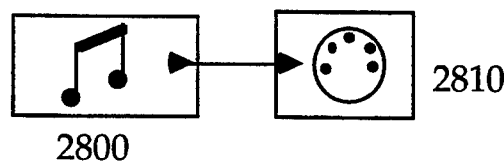
FIG. 28 shows how two components, a MIDI player 2800 and a MIDI interface 2810, can be used to play a music synthesizer connected to the computer in accordance with a preferred embodiment.

MIDI input and output ports are used to route time-stamped MIDI packets from one media component to another. MIDI ports act as mailboxes for the communication of MIDI packets across address spaces. Many interesting MIDI applications can be created by connecting media components that contain MIDI ports. FIG. 28 illustrates how two components, a MIDI player 2800 and a MIDI interface 2810, can be used to play a music synthesizer connected to the computer. The MIDI interface is used to connect external devices, such as a music synthesizer. MIDI packets are sent from the MIDI player to the MIDI interface. The MIDI interface 2810 converts the MIDI packets to MIDI data which is sent to the music synthesizer for playback.

Figure 29:
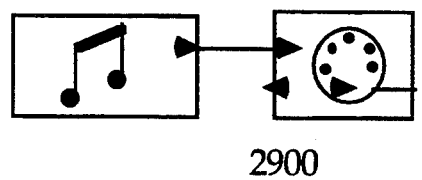
FIG. 29 shows how MIDI data can be recorded and played back from an external music synthesizer in accordance with a preferred embodiment.
Figure 30:
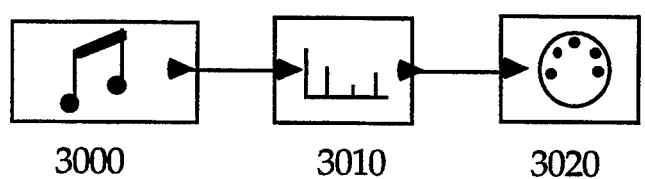
FIG. 30 illustrates how MIDI data can be played back in accordance with a preferred embodiment.

FIG. 29 shows how MIDI data can be recorded and played back from an external music synthesizer. The MIDI interface 2910 has a MIDI output port that produces MIDI packets based upon data received from the music synthesizer. The MIDI player 2900 has a MIDI input port that reads these packets and stores them on the computer. FIG. 30 illustrates how MIDI data can be played back 3000, filtered 3010, and sent to an external music synthesizer 3020. A filter 3010 can perform an operation on its input 3000 and pass the result on to its output 3010. Specific filters can be written, for example, to add extra notes to create a MIDI echo, delay, or to prune pitch band to reduce bandwidth load.

Figure 31:
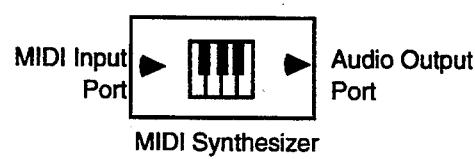
FIG. 31 shows a media component that contains both MIDI and audio ports in accordance with a preferred embodiment.

FIG. 31 shows a media component that contains both MIDI and audio ports. A software-based music synthesizer reads MIDI packets from its input port and outputs digital audio that represents the notes read on the input port. MIDI ports are connected together by means of port surrogates. Every MIDI component has member functions which create surrogates for its input and output ports. Clients perform connection operations by requesting input and/or output port surrogates from each component and then using the member functions provided by the surrogate objects to connect the actual input ports to actual output ports. Each MIDI port and port surrogate has a MIDI type associated with it. When two ports are asked to connect, a type negotiation protocol insures that the ports are capable of supporting compatible data types. An exception is generated if the ports have no types in common.

The process of connecting MIDI components can be represented graphically on a display by extending a geometric figure such as a line segment between the indicia representative of a MIDI input and output ports.

MIDI Packets

Figure 32:
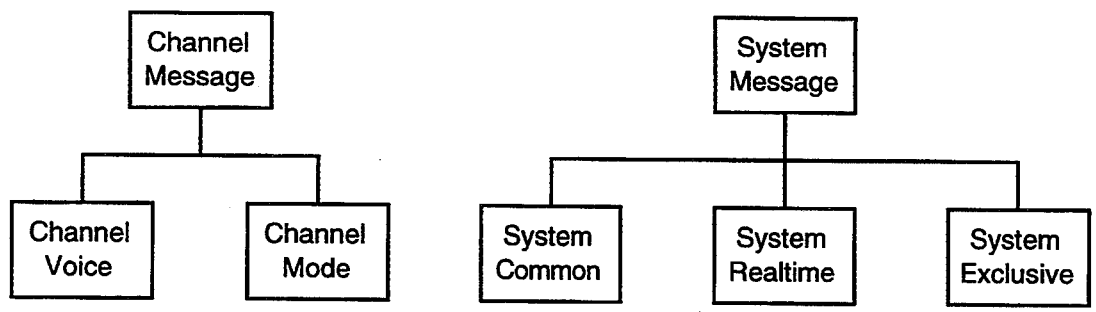
FIG. 32 illustrates the detailed system messages divided into common, real-time, and exclusive messages in accordance with a preferred embodiment.
Figure 33:
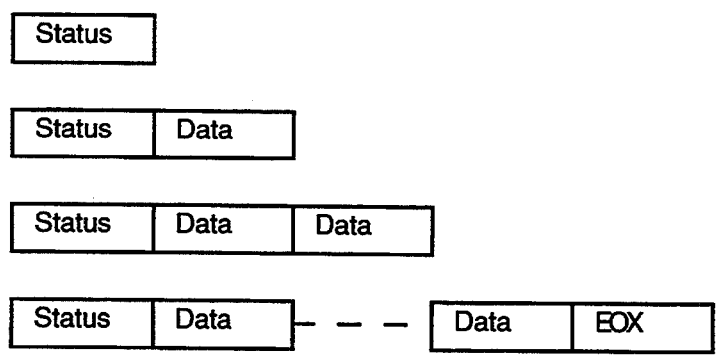
FIG. 33 is an illustration of some of the formats of MIDI messages in accordance with a preferred embodiment.

Devices that support MIDI communicate with each other by sending and receiving MIDI messages. The MIDI standard defines two types of messages: channel messages and system messages. Channel messages are further divided into voice and mode messages. System messages are further divided into common, real-time, and exclusive messages as shown in FIG. 32. Channel Voice messages contain a channel number (0–15), to which a MIDI device can listen. Channel Mode messages are sent on the basic channel to determine an instrument's response to Channel Voice messages. System Common messages go to all receivers, and System Real-time messages carry synchronization information to clock-based instruments. System exclusive messages allow manufacturers to offer MIDI support beyond that specified by the standard. All messages start with a status byte, except consecutive messages of the same type which may optionally drop the status byte (running status). All message types except system exclusive, have zero, one, or two data bytes. System exclusive messages consist of any number of data bytes, terminated by an EOX byte. FIG. 33 exhibits formats of MIDI messages in accordance with a preferred embodiment.

MIDI Packet Encapsulates the Standard

Figure 34:
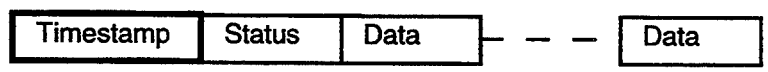
FIG. 34 is an illustration of a MIDI packet object encapsulating MIDI message types and structures, a status byte and a time stamp in accordance with a preferred embodiment.

A MIDI packet object encapsulates all the MIDI message types and structures. In addition, all MIDI packet objects have a status byte and a time stamp, as shown in FIG. 34. Subclasses of MIDI packets reflect the MIDI protocol by defining message types with convenient constructors and access member functions.

MIDI Ports

MIDI ports are used to exchange MIDI packets between media components. A MIDI output port can write a MIDI packet, and a MIDI input port can read a MIDI packet. An output port can be connected to an input port with a surrogate port. Surrogate ports cannot read or write MIDI packets. Instead they are passive objects that can be passed to other address spaces to support connections. Member functions are provided for writing one or many messages at a time to an output port. Similarly, when reading from an input port, either the next message or a count of all buffered messages may be requested. Read will block until the buffer is non-empty, and a blocked Read call can be canceled by another task. A copy of the packet written to an output port is read from the input port.

Packets are read in order of arrival and are not sorted by time stamp. If time-ordered merging of two streams is required, a sorting merge object will be needed. To understand why an input port does not sort, recall first that time can flow both forwards and backwards. Consider a particular playback scenario involving a sequence with events at 6, 8, and 10 seconds. If time starts at 5, goes until 11, turns around, and goes back to 5, the order of events should be 6, 8, 10, 10, 8, 6 and not 6, 6, 8, 8, 10, 10. It is precisely because time goes in both directions that sorting does not suffice for buffering packets.

Figure 35:
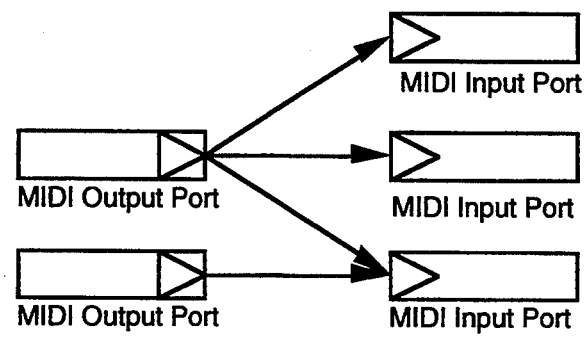
FIG. 35 illustrates an example of a fanning operation in accordance with a preferred embodiment.

Fan-in and fan-out of connections is supported. Fanning refers to the capability of a MIDI output port to be connected to more than one MIDI input port, and a MIDI input port can have more than one MIDI output port connected to it. FIG. 35 illustrates an example of a fanning operation in accordance with a preferred embodiment.

Implementing MIDI Ports

A preferred embodiment utilizes a list of connected ports for keeping track of MIDI port connections and a shared buffer for delivering and receiving packets. Each port maintains a list of all the other ports to which it is connected. This list is updated by Connect and Disconnect calls and is used when ports are destroyed to notify all ports that are connected to it that have gone away. This processing prevents an output port from having an input port in its list of connections and trying to write to it, when in fact the input port was destroyed. Thus, an output port maintains a list of input ports that it uses to implement the Write call, and it writes to each port in its list. And an input port maintains a list of output ports that are connected to it and that must be notified when it goes away. A shared buffer supports a producer-consumer protocol. When the buffer is empty, a task may block until it is non empty. Another task that subsequently deposits into its buffer may notify the blocked task that it has written. Alternatively, yet another task may cancel the block, resulting in another kind of notification.

Figure 36:
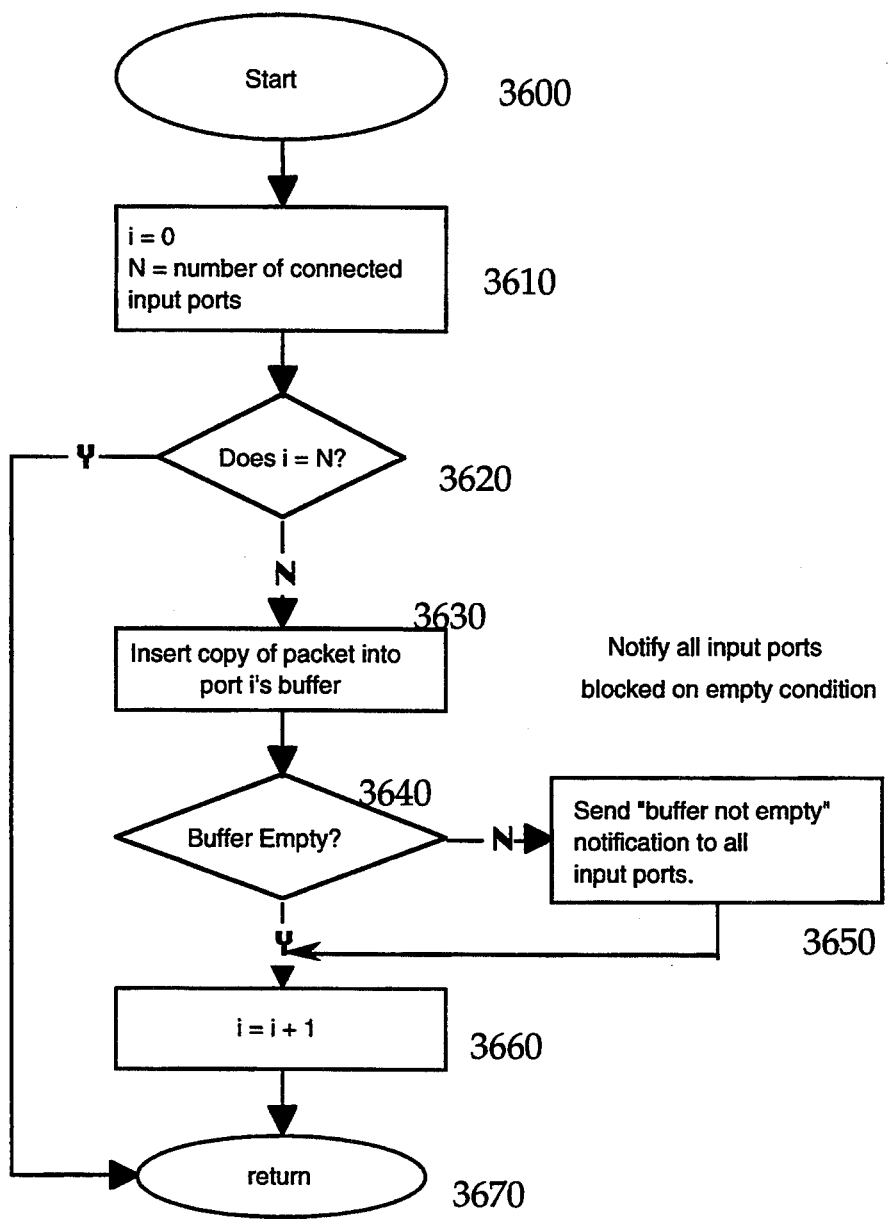
FIG. 36 is an illustration of a MIDI output port's Write() member function in accordance with a preferred embodiment.

A MIDI output port's Write() member function is depicted in FIG. 36. Processing commences at terminal 3600 and immediately passes to function block 3610 to initialize a counter, and a limit value for a loop. Then, at decision block 3620, a test is performed to determine if the counter has reached the limit value. If the counter has, then processing is completed at terminal 3670. If the counter has not, then at function block 3630, a copy of the packet is inserted into a port's buffer, and a test is performed at decision block 3640 to determine if the buffer has a message. If the buffer is not empty, then an appropriate message is transmitted as shown in function block 3650. If not, then no message is sent. In either case, the counter is incremented at function block 3660 and control is returned via terminal 3670.

Figure 37:
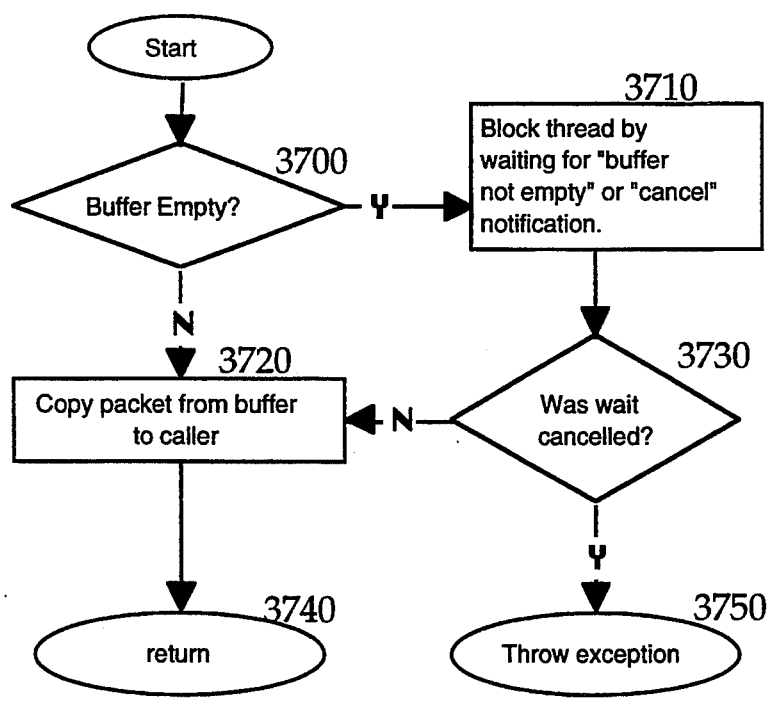
FIG. 37 is an illustration of a MIDI input port's Read() member function in accordance with a preferred embodiment.

A MIDI input port's Read() member function is depicted in FIG. 37. Processing commences at decision block 3700 to determine if the buffer is empty. If so, then the task is blocked until the buffer contains information or a cancel occurs at function block 3710. A test is performed at decision block 3730 to determine if the wait was cancelled. If so, then an exception occurs at terminal 3750. If not, or if the buffer was not empty at decision block 3700, then a packet is copied from the buffer to the caller at function block 3720 and processing is completed by returning at terminal 3740.

Abstract MultiMedia Components Media Component

Figure 38:
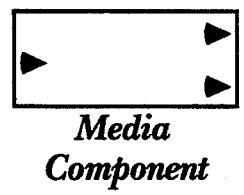
FIG. 38 illustrates a media component having a single input port and two output ports in accordance with a preferred embodiment.

Atime-based media component, referred to as a media component base class is a central abstraction used for routing. A media component has zero or more input ports and zero or more output ports. In FIG. 38, for example, the media component has a single input port and two output ports.

Media Sequence

Mediasequence is an abstract base class that represents media content, including audio sequences. Subclasses of mediasequence are used to represent clips of audio, video, and MIDI. Media sequences are characterized by a duration and a list of types. The duration, represented by a floating point value, indicative of how long the data is. The data is also typed, to indicate what type of sound is represented by the data, for example video, audio, etc. It is possible for a subclass to support multiple types. For example, an audio subclass can supply data in both a linear form and a compressed form. Because of this possibility, mediasequence has a list of types.

Player

Figure 39:
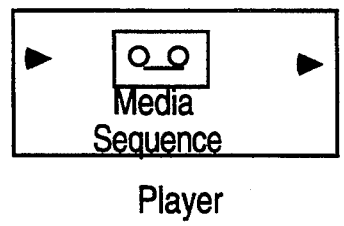
FIG. 39 presents an example of a media component that can play time-based media sequences in accordance with a preferred embodiment.

FIG. 39 presents an example of a time-based media player (player) base class is a media component that can play time-based media sequences (referred to as a media sequence). A media sequence is an abstract base class that can be used to represent a clip of audio, video, animation, or MIDI data. Subclasses of the time-based media sequence are used to implement audio, video, animation, and MIDI sequences. A player is analogous to a tape recorder while a media sequence is analogous to a cassette tape. A player has a Play() member function to play the media sequence, a Record() member function to record into the sequence, and a Stop() member function to stop playback or recording. It also has a Seek() member function to seek to a position in the sequence, as well as member functions to allow the player to synchronize to other players or to software clocks. Separating players from data also allows players to be reused. After playing one cassette, a player can then be instructed to play or record another.

Standard Audio Components Audio Player

Figure 40:
FIG. 40 illustrates an audio player for an audio component to play and record audio data in accordance with a preferred embodiment.

FIG. 40 illustrates an audio player, which has an associated abstract base class, for an audio component to play and record audio data. Audio data is stored in objects called audio sequences, which are subclasses of media sequences. An audio player is analogous to a tape recorder and the audio sequence is analogous to a cassette. An audio player is a subclass of a player. Like all players—sound, video, or MIDI—an audio player has a Play() member function, so that the sound can be heard, and a Record() member function, so the sequence can be recorded (if writing is allowed), and Stop() to stop recording or playing. Is has a Seek() member function to randomly access a point in the sound. It also has member functions to allow the player to be synchronized to another media player or a software clock.

Speaker

Figure 41:
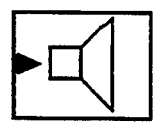
FIG. 41 illustrates an example of a speaker component in accordance with a preferred embodiment.

FIG. 41 illustrates an example of a speaker component. A speaker component is an abstract base class for an audio output device. A system may have several sound output devices connected to it. A speaker component can be subclassed to represent various features of the output devices. For example, a subclass of a speaker component exists to allow playback over the telephone handset or telephone line. A speaker component is a logical output device—many instances of speaker components can exist—all are mixed together and played out on the computer's physical speaker. Stereo output devices would be represented by two subclasses of the speaker component, one for the left channel and one for the right.

Microphone

Figure 42:
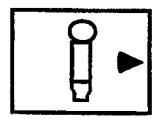
FIG. 42 illustrates a microphone component in accordance with a preferred embodiment.

FIG. 42 illustrates a microphone component in accordance with a preferred embodiment. A microphone component is an abstract base class representing a sound input source, such as a microphone or a line input. A system may have several sound input devices connected to it. A microphone component can be subclassed to represent these devices. For example, a subclass of the microphone component is used to facilitate recording from the telephone handset or telephone line. Like a speaker component, the microphone component is a logical device—multiple instances of a microphone component can exist, all instances produce identical audio which comes from the same physical microphone. A microphone component has one output. Because a microphone component is a source of data, you must start it explicitly by calling Start(). It can be stopped by calling Stop(). Stereo input devices are represented by two subclasses of a microphone component, one for the left channel and one for the right.

Mixer

Figure 43:
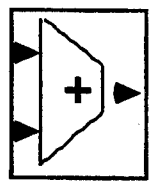
FIG. 43 illustrates an example of a mixer component in accordance with a preferred embodiment.

FIG. 43 illustrates an example of a mixer component. A mixer component is an abstract base class that sums two or more audio inputs into a single audio output. The number of inputs is determined by the input to the constructor.

Splitter

Figure 44:
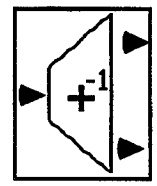
FIG. 44 illustrates an example of a splitter component in accordance with a preferred embodiment.

FIG. 44 illustrates an example of a splitter component. A splitter component is an abstract base class that takes one input and splits it into two or more outputs. The number of outputs is determined by what is passed to the constructor.

Gain

Figure 45:
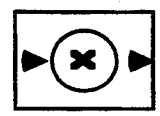
FIG. 45 illustrates an example of a gain component in accordance with a preferred embodiment.

FIG. 45 illustrates an example of a gain component. A gain component is an abstract base class that can increase or decrease the amplitude (size) of a signal. It is used for volume control, and has SetGain() and GetGain() functions. Mathematically, a gain component multiplies each input sound sample by the gain value and feeds the result to its output. A gain value of 1.0 doesn't modify the signal at all, while a gain of 2.0 makes it twice as loud, 0.5 as a gain value changes the signal to half as loud. Large signal levels are clipped.

Echo

Figure 46:
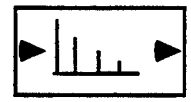
FIG. 46 illustrates an echo component in accordance with a preferred embodiment.

FIG. 46 illustrates an echo component in accordance with a preferred embodiment. An echo component is an abstract base class that adds an echo to its input and produces the result on its output. An echo component has three parameters you can set, the delay length, feedback, and the mix ratio. Large delay lengths make the input sound like it's in a large canyon, while small delays can produce a flanging effect similar to the whooshing of a jet airplane. The feedback determines the number of echoes heard. The mix ratio determines how much of the echoed signal is mixed back in.

Fuzz

Figure 47:
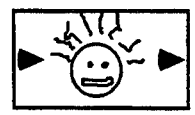
FIG. 47 illustrates a fuzz component in accordance with a preferred embodiment.

FIG. 47 illustrates a fuzz component in accordance with a preferred embodiment. A fuzz component is an abstract base class that adds distortion to a sound. This effect is most useful on guitar or musical instrument sounds.

Audio Type Converter

Figure 48:
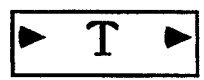
FIG. 48 illustrates an example of an audio type converter in accordance with a preferred embodiment.

FIG. 48 illustrates an example of an audio type converter. An audio type converter component is an abstract base class that converts from one audio type to another.

Audio MultiConverter

Figure 49:
FIG. 49 illustrates an audio multiconverter in accordance with a preferred embodiment.

FIG. 49 illustrates an audio multiconverter in accordance with a preferred embodiment. An audio multiconverter component converts from multiple audio types to a plurality of other audio types based on a particular selection.

Sound

Figure 50:
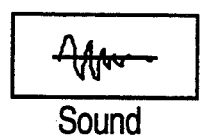
FIG. 50 illustrates a sound component in accordance with a preferred embodiment.
Figure 51:
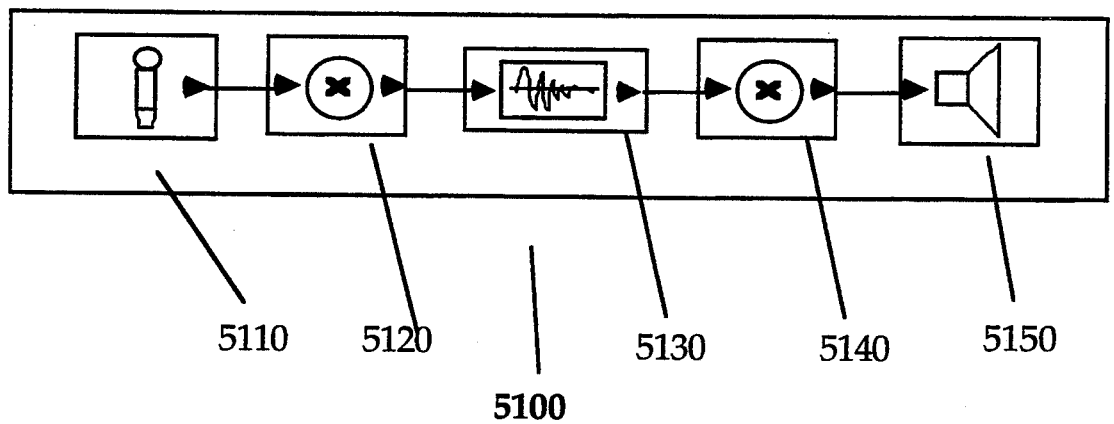
FIG. 51 illustrates the components imbedded in a sound component with a preferred embodiment.

FIG. 50 illustrates a sound component in accordance with a preferred embodiment. A sound component is a convenience object useful for recording and playing sound. FIG. 51 illustrates the components imbedded in a sound component. A sound component 5100 contains a microphone component 5110, a gain component 5120 (to control input level), an audio player component 5130, another gain component 5140 (to control output level) and a speaker component 5150. Given a sound file name, a sound component will automatically create the correct audio sequence and the necessary audio components to play and record the file.

Physical Speaker

Figure 52:
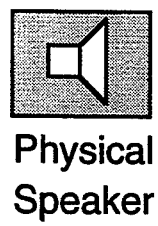
FIG. 52 illustrates a physical speaker component in accordance with a preferred embodiment.

FIG. 52 illustrates a physical speaker component in accordance with a preferred embodiment. A physical speaker component is a surrogate for the computer's output amplifier and speaker. It is used to control volume for the entire computer. If the computer has other sound output devices, corresponding subclasses of a physical speaker would exist. Physical speaker components have SetVolume() and GetVolume() member functions to set and get the overall volume level.

Physical Microphone

Figure 53:
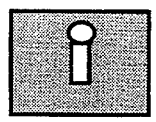
FIG. 53 illustrates a physical microphone component in accordance with a preferred embodiment.

FIG. 53 illustrates a physical microphone component in accordance with a preferred embodiment. A physical microphone component represents the actual hardware for a microphone or line input. The overall input level coming into the computer can be set.

Standard Video Components Graphic Player

Figure 54:
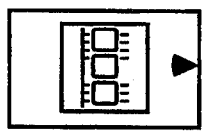
FIG. 54 illustrates a graphic player component in accordance with a preferred embodiment.

FIG. 54 illustrates a graphic player component in accordance with a preferred embodiment. A graphic player component is an abstract base class for a component that can play and record time graphics objects which are graphic objects that vary over time. A graphic sequence is a subclass of time graphic. A graphic sequence is an ordered sequence of graphic objects, where each graphic object has a duration. An graphic player is analogous to a video tape recorder and the graphic sequence is analogous to a video cassette. A graphic player is a subclass of a player. Like all players—sound, video, or MIDI—a graphic player has a Play() member function, so that the graphic objects can be seen, and a Record() member function, so the sequence can be recorded (if writing is allowed), and Stop() to stop recording or playing. Is has a Seek() member function to randomly access a point in the sequence. It also has member functions to allow the player to be synchronized to another media player or a software clock.

Graphic Viewer

Figure 55:
FIG. 55 illustrates a graphic viewer component in accordance with a preferred embodiment.

FIG. 55 illustrates a graphic viewer component in accordance with a preferred embodiment. A graphic viewer component is used to view graphic objects on a computer display. A graphic player must be connected to a graphic viewer in order to see the played graphic objects. Using an analogy to consumer electronic video, a graphic player is like video tape recorder, while a graphic viewer is like a video display monitor.

Video Digitizer

Figure 56:
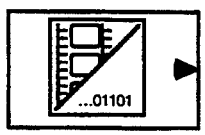
FIG. 56 illustrates a video digitizer component in accordance with a preferred embodiment.

FIG. 56 illustrates a video digitizer component in accordance with a preferred embodiment. A video digitizer component converts analog video digitized by a hardware video digitizer connected to the computer into graphic objects. A video digitizer can be connected to a graphic player to record analog video entering the computer. Using an analogy to a consumer electronic video, the video digitizer is analogous to a video camera while the graphic player is analogous to a video tape recorder.

Standard MIDI Components MIDI Player

Figure 57:
FIG. 57 illustrates a MIDI player component in accordance with a preferred embodiment.

FIG. 57 illustrates a MIDI player component in accordance with a preferred embodiment. A MIDI player component is an abstract base class for a component that can play and record MIDI Sequences. A MIDI sequence is a collection of MIDI Tracks. A MIDI Track is an ordered sequence MIDI Packets. A MIDI player is a subclass of a player. Like all players—sound, video, or MIDI—a MIDI player has a Play() member function, so that MIDI Packets can be sent to an external music synthesizer, and a Record() member function, so that MIDI messages from an external keyboard can be recorded (if writing is allowed), and Stop() to stop recording or playing. Is has a Seek() member function to randomly access a point in the sequence. It also has member functions to allow the player to be synchronized to another media player or a software clock.

MIDI Interface

Figure 58:
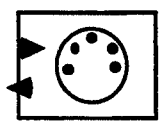
FIG. 58 illustrates a MIDI interface component in accordance with a preferred embodiment.

FIG. 58 illustrates a MIDI interface component in accordance with a preferred embodiment. A MIDI interface component both sends MIDI packets to an external music synthesizer and receives them. A MIDI player must be connected to a MIDI interface in order to play or record MIDI messages.

MIDI Filter

Figure 59:
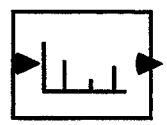
FIG. 59 illustrates a MIDI flter component in accordance with a preferred embodiment.

FIG. 59 illustrates a MIDI filter component in accordance with a preferred embodiment. A MIDI filter component is an abstract base class for an object that has one MIDI input port and one MIDI output port. Subclasses supply a transformation algorithm that converts the input data to output data.

MIDI Mapper

Figure 60:
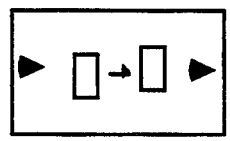
FIG. 60 illustrates a MIDI mapper component in accordance with a preferred embodiment.

FIG. 60 illustrates a MIDI mapper component in accordance with a preferred embodiment. The MIDI mapper component is a subclass of MIDI Filter that uses a dictionary to map input MIDI packets to output MIDI packets. Each entry in the dictionary is a pair of MIDI packets, an input packet (called the key) and an output packet (called the value). Input MIDI packets coming into the MIDI mapper are used as look up keys to the dictionary. The result of the lookup is the output MIDI packet, which is written out the output port.

MIDI Program Mapper

Figure 61:
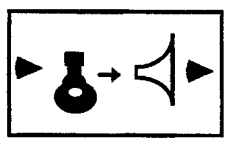
FIG. 61 illustrates a MIDI program mapper component in accordance with a preferred embodiment.

FIG. 61 illustrates a MIDI program mapper component in accordance with a preferred embodiment. A MIDI program mapper component is a subclass of MIDI Mapper. It converts MIDI program change messages to other MIDI program change messages. It can be used to map any instrument to any other.

MIDI Note Mapper

Figure 62:
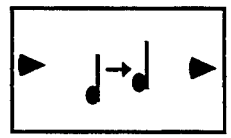
FIG. 62 illustrates a MIDI note mapper component in accordance with a preferred embodiment.

FIG. 62 illustrates a MIDI note mapper component in accordance with a preferred embodiment. A MIDI note mapper component is a subclass of MIDI Mapper. It converts MIDI note on and note off messages, allowing notes to be transposed.

MIDI Channel Mapper

Figure 63:
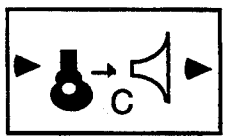
FIG. 63 illustrates a MIDI channel mapper component in accordance with a preferred embodiment.

FIG. 63 illustrates a MIDI channel mapper component in accordance with a preferred embodiment. A MIDI channel mapper component is a subclass of MIDI Mapper. It converts MIDI channel voice and mode messages and can be used for general purpose channel changing.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An object-oriented operating system for enabling multimedia presentations, comprising:
    (a) a processor;
    (b) a storage under the control of and attached to said processor;
    (c) a display under the control of and attached to said processor;
    (d) a plurality of multimedia objects in said storage and displayable on said display, each of said plurality of multimedia objects including:
        a displayable icon representing said each multimedia object,
        subroutines for processing multimedia information,
        a port location through which said multimedia information can be transmitted, said port location being connectable to another port location in at least one other of said plurality of multimedia objects, and
        a list of selected ones of said plurality of multimedia objects to which said port location is connected;
    (e) an audio object for processing audio information, said audio object including an audio icon displayable on said display;
    (f) a connecting object represented by a geometric indicia presented on said display and stored in said storage for use in connecting a first one of said plurality of multimedia objects to said audio object, said connecting object having an input port location for receiving audio information, an output port location for transmitting received audio information, an internal buffer, means for connecting said input port location to said internal buffer and means for connecting said internal buffer to said output port location in order to temporarily store said received audio information during transmission from said input port location to said output port location;
    audio conversion means for linking multimedia objects of different types; and
    (g) means under the control of the processor for routing said audio information between the first one multimedia object and said audio object via said connecting object.

2. The system as recited in claim 1, including at least one port means in the multimedia objects for receiving audio information.

3. The system as recited in claim 1, including at least one port means in the multimedia objects for sending audio information.

4. The system as recited in claim 2, including means for playing voice recordings.

5. The system as recited in claim 1, including means for playing music.

6. The system as recited in claim 1, including means for replaying sound effects.

7. The system as recited in claim 1, including means for converting from one audio type to another audio type.

8. The system as recited in claim 1, including means for converting from one audio type to a plurality of audio types.

9. The system as recited in claim 1, including means for linking a data type with each port of the multimedia objects and connecting multimedia objects polymorphically.

10. A method for enabling multimedia presentations on a computer system including a processor with an attached storage and display, including a connection object resident in said attached storage and under the control of said processor, comprising the steps of:
    (a) creating a plurality of multimedia objects in said storage, each of said plurality of multimedia objects including a displayable icon, means for processing multimedia information and a port location for transmitting and receiving multimedia information for use in connecting said each multimedia object to another of said plurality of multimedia objects, said each multimedia object further including a list of ones of said plurality of multimedia objects to which said port location is connected;

(b) creating an audio object including a displayable audio icon, means for processing audio information and further including an audio port location for use in connecting said audio object to one of said plurality of multimedia objects;

(c) displaying a first icon representing one of said plurality of multimedia objects on said display, said one of said plurality of multimedia objects processing audio information;

(d) displaying said audio icon on said display;

(e) verifying a port location in said one multimedia object can process audio information;

(f) connecting said first icon to said audio icon utilizing a geometric indicia drawn between said first icon and said audio icon on said display;

linking multimedia objects of different types; and (g) in response to the connection established in step f, routing audio information between said one multimedia object and said audio object to create a multimedia presentation.

11. The method as recited in claim 10, including the step of receiving audio information at a multimedia object port.

12. The method as recited in claim 10, including the step of sending audio information to a multimedia object port.

13. The method as recited in claim 11, including the step of playing voice recordings in the multimedia presentation.

14. The method as recited in claim 10, including the step of playing music.

15. The method as recited in claim 10, including the step of replaying sound effects.

16. The method as recited in claim 10, including the step of converting from one audio type to another audio type.

17. The method as recited in claim 10, including the step of converting from one audio type to a plurality of audio types.

18. The method as recited in claim 10, including the step of linking a data type with each port of the multimedia objects and connecting multimedia objects polymorphically.

19. The method as recited in claim 10, wherein at least one of the multimedia objects is a microphone multimedia object.

20. The method as recited in claim 10, wherein at least one of the multimedia objects is a speaker multimedia object.

21. The system as recited in claim 1, wherein at least one of the multimedia objects is a microphone multimedia object.

22. The system as recited in claim 1, wherein at least one of the multimedia objects is a speaker multimedia object.

* * * * *